United States Patent
Paolini et al.

(10) Patent No.: US 9,820,360 B2
(45) Date of Patent: Nov. 14, 2017

(54) ILLUMINATION CONTENT PRODUCTION AND USE

(71) Applicant: Telelumen, LLC, Saratoga, CA (US)

(72) Inventors: Steven Paolini, Saratoga, CA (US); Veronika Zelikson, Sunnyvale, CA (US); Dmitri Simonian, Santa Clara, CA (US); Ross D Archer, San Jose, CA (US)

(73) Assignee: TELELUMEN, LLC, Saratoga, CA (US)

( * ) Notice: Subject to any disclaimer, the term of this patent is extended or adjusted under 35 U.S.C. 154(b) by 0 days.

(21) Appl. No.: 14/943,328

(22) Filed: Nov. 17, 2015

(65) Prior Publication Data

US 2017/0142809 A1    May 18, 2017

(51) Int. Cl.
H05B 37/02 (2006.01)

(52) U.S. Cl.
CPC ............... H05B 37/0272 (2013.01)

(58) Field of Classification Search
CPC .................................................. H05B 37/0207
USPC .......................................................... 315/312
See application file for complete search history.

(56) References Cited

U.S. PATENT DOCUMENTS

| | | | |
|---|---|---|---|
| 8,021,021 B2 | 9/2011 | Paolini | |
| 8,469,547 B2 | 6/2013 | Paolini | |
| 8,922,570 B2 | 12/2014 | Archer | |
| 9,028,094 B2 | 5/2015 | Paolini | |
| 9,217,247 B2 | 12/2015 | Behling et al. | |
| 2003/0133184 A1 | 7/2003 | Fischer et al. | |
| 2005/0275626 A1 | 12/2005 | Mueller et al. | |
| 2006/0006820 A1* | 1/2006 | Roseman | H05B 37/00 315/312 |
| 2007/0174773 A1* | 7/2007 | Abernethy, Jr. | H05B 37/029 715/716 |
| 2009/0323321 A1* | 12/2009 | Paolini | H05B 33/086 362/231 |
| 2012/0229048 A1* | 9/2012 | Archer | H05B 37/0245 315/297 |
| 2013/0307419 A1* | 11/2013 | Simonian | H05B 33/0872 315/153 |
| 2015/0102730 A1 | 4/2015 | Eisele et al. | |
| 2015/0123564 A1 | 5/2015 | Simonian et al. | |
| 2015/0189719 A1 | 7/2015 | Archer | |
| 2015/0211925 A1 | 7/2015 | Paolini | |
| 2015/0354789 A1* | 12/2015 | Paolini | F21V 14/003 349/16 |
| 2017/0034520 A1* | 2/2017 | Rosewarne | H04N 19/1887 |

* cited by examiner

Primary Examiner — Dylan White

(74) Attorney, Agent, or Firm — David Millers

(57) ABSTRACT

An illumination content editing system and an illumination content translator allow creation or alteration of illumination content and translation of illumination content so that illumination represented by the illumination content can be played in disparate illumination systems. Translation may particularly employ characteristics of the disparate illumination systems, and the characterizations may be determined using automated or manual processes.

20 Claims, 9 Drawing Sheets

ILLUMINATION CONTENT PRODUCTION AND USE

BACKGROUND

High-capability illumination systems (e.g., light players capable of dynamic spectrum output over time) can reproduce or approximate simple or complex illumination in virtually any environment. For example, a high-capability illumination system may be able to dynamically control the intensity, the spectral power distribution, the apparent spatial origins, and the directional and divergence characteristics of the illumination in an environment such as an office, a store, a theater, a room of a home, a work place, a green house, or a laboratory. Such systems may be able to mimic almost any illumination, e.g., to reproduce or approximate light from any natural or artificial light sources. A high-capability illumination system may further be able to select and produce illumination for many different purposes, including optimizing energy efficiency of light production for human vision, displaying illuminated items to their best advantage, producing an aesthetically pleasing static or dynamic lighting effect, optimizing a specific human activity such as working, sleeping, or waking, improving health or alertness (e.g., through illumination patterns that influence circadian rhythms or remedy jet lag), optimizing or altering plant growth or biological processes, creating a controlled electromagnetic event in a laboratory or other setting, or providing lighting to accompany music, video, games, or other presentations.

U.S. Pat. No. 8,021,021, entitled "Authoring, Recording and Replication of Lighting" describes a high-capability illumination system and particularly a luminaire that independently varies the respective intensities of multiple spectral channels. In such a system, the combined illumination from all of the spectral channels, e.g., the sum of the component spectral power distributions at their respective intensities, may produce or approximate a target spectral power distribution.

Programmable high-capability illumination systems generally need content that indicates the nature of the illumination to be produced, but the range of possible differences in illumination systems presents difficulty producing the same illumination in different environments with different illumination systems. For example, different multi-channel luminaires may have different numbers of spectral channels, and even if two luminaires have the same number of spectral channels, emission characteristics of the spectral channels such the peak wavelengths, the shapes of the spectral power distributions, and the maximum intensities or power produced by the respective spectral channels of one luminaire may differ from the corresponding emission characteristics of the spectral channels of the other luminaire. Further, an illumination system for an environment may include any number of light sources, and the positions and orientations of the light sources may differ greatly from one illumination system to the next. Accordingly, a custom-built illumination system (e.g., a high-end home system or a system for a concert hall or a theater) may be uniquely created for a particular structure, building, or room and may require content created specifically for that system. Because of the differences between illumination systems, custom-built illumination systems are generally unable to use content that was created for other illumination systems.

BRIEF DESCRIPTION OF THE DRAWINGS

The drawings illustrate examples for the purpose of explanation and are not of the invention itself. Use of the same reference symbols in different figures indicates similar or identical items.

DETAILED DESCRIPTION

Figure 1:
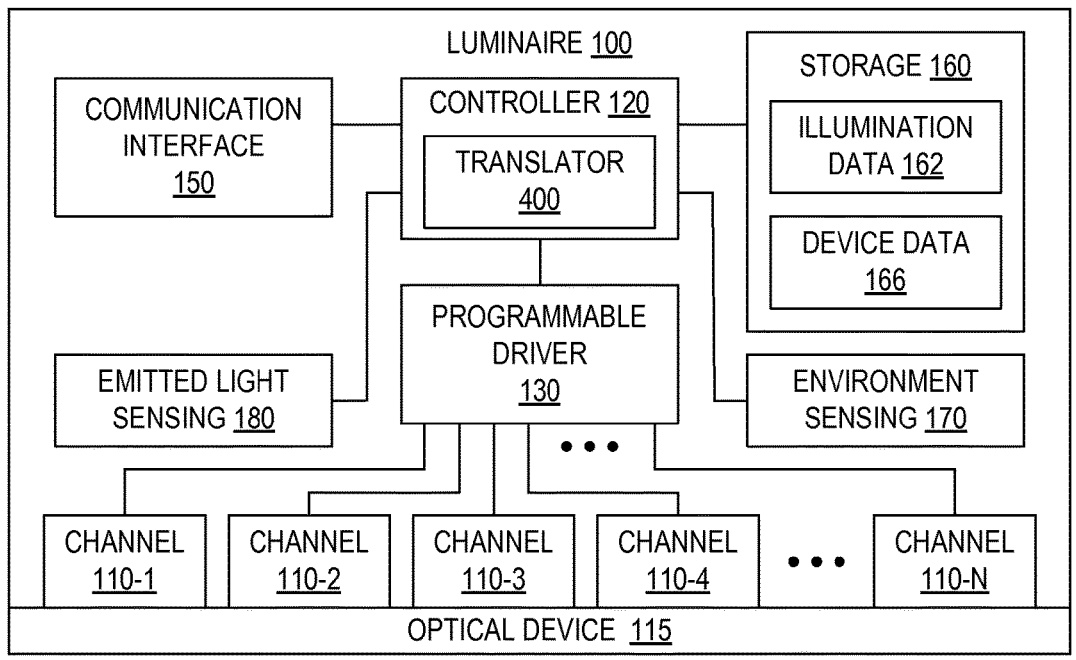
FIG. 1 is a block diagram of a luminaire having multiple independently controllable spectral channels.

In accordance with an aspect of the invention, systems and methods for editing or translating illumination content may be applied during creation or marketing of illumination content or during playback of such illumination content in illumination systems. Such illumination may be used not only for human vision or human response but also for reception by other living things such as plants or animals or by inanimate receptors, e.g., for communication and sensing. Accordingly, illumination and light as used herein is not limited to visible light but may include electromagnetic radiation with wavelengths outside the range visible to humans and may generally include any electromagnetic event that a system produces.

Differences in the configurations and capabilities of illumination systems and illuminated environments add complexity to processes for creating, editing, translating, formatting, and playing illumination content. In accordance with aspects disclosed herein, a human user or an automated system can synthesize or edit illumination content for a real or virtual illumination system, and illumination content suitable for one illumination system can be translated to create translated illumination content for use in other illumination systems, which may have very different configurations and capabilities. Further, the illumination editing, translation, and playback systems and processes may require or employ characterizing information indicating the configuration and capabilities of specific illumination systems or illuminated environments, and methods disclosed herein can collect characterizing information.

An illumination content editing system and a universal translator are particularly disclosed herein that can provide illumination content to illumination systems that may include one or more programmable luminaires. In one application, the editing system and translator systems may provide a suite of tools that a human user may employ when producing illumination content. In another application, an automated translator or an automated adaptor in or for a light player may affect real-time translation or editing of illumination content. For example, a translator may translate illumination content for use in an illumination system, and an automated adaptor may apply filters, limiters, or compressors to the translated illumination content, as necessary or desired based on user preferences, learning algorithms, or sensor measurements. A light player with adaptive functions may particularly modify illumination content for an environment based on current measurements in the environment or based on characterizing data for the illumination system and environment.

In accordance with one particular aspect disclosed herein, a universal translator may translate or convert illumination content for playing in diverse illumination systems. The illumination content may correspond to illumination having specific spectral, distributional, or directional characteristics and may include a script, operating instructions, data, or parameters necessary for a target illumination system to playback the corresponding illumination in a target environment. For example, illumination content might correspond to springtime skylight illumination in an office building in Sweden during the winter, and the illumination content may be embodied as illumination content media such as a memory or other device storing a file that a particular illumination system can interpret to playback the springtime skylight illumination. The translator may operate offline or in real time on source illumination content, e.g., illumination content for a source illumination system, to produce translated illumination content that an illumination system, sometimes referred to herein as the target illumination system, can interpret to playback the corresponding springtime skylight illumination. In general, the source illumination content may be illumination content for a particular real or virtual illumination system or may be defined without reference to any illumination system. For example, source illumination content may simply be one or more sequences of spectral power distributions representing time evolution of illumination.

A companion tool to the universal translator is an editing system that allows manipulation and combination of illumination content to produce new illumination content. The illumination content editing system may serve purposes similar to the purposes of music, video, or other editing systems and may have some functions or operations, e.g., sequencing, synchronizing, and combining of serial or parallel tracks of content, that are similar to the functions and operations of music, video, or other editing systems. The illumination content editing system may also have some functions that are specific to illumination, e.g., time variant spectral filtering for the purpose of circadian rhythm optimization with respect to the time of playback. In one application, an author of illumination content may employ the editing system when creating or altering illumination content. In another application, an adapter associated with a light player and may perform editing operations on illumination content being played.

Standardization of high-capability illumination systems may be impractical or undesirable, and in general, many different types and configurations of illumination systems may be used in or for different illuminated environments. Accordingly, the editing, translating, and playing back illumination content may require characterizing information that indicates the configurations and capabilities of illumination systems. A translator, for example, may need a characterization of a source illumination system that is able to play the source illumination content and a characterization of a target illumination system that is able to play the translated illumination content. The characterization of an illumination system may include a table or list of the light sources in the illumination system and may further indicate the locations, capabilities, or characteristics of the light sources. To illustrate some of the issues associated with characterizing an illumination system, FIG. 1 shows one example of a multi-channel luminaire 100 that is programmable to emit illumination with a spectral power distribution that may vary in a controlled manner. (The term "luminaire" as used herein to refers to an electromagnetic radiator generally and is not limited to being a source of visible light.)

Luminaire 100 as shown contains multiple spectral channels 110-1 to 110-N. Spectral channels 110-1 to 110-N may emit light with different emission characteristics, e.g., different spectral power distributions and/or different degrees of collimation, polarization, or coherency. In general, spectral channels 110-1 to 110-N are not intended to be viewed directly but instead provide electromagnetic radiation or illumination in an environment. In one specific application, a user views the environment as illuminated by the illumination system. As noted above, the light from spectral channels 110-1 to 110-N is not limited to visible light. In particular, spectral channels 110-1 to 110-N may produce electromagnetic radiation with wavelengths longer or shorter than visible light, e.g., infrared or ultraviolet light, for purposes other than human vision or for secondary human viewing effects such as fluorescence. Each spectral channel 110 may include one or more lighting elements, e.g., one or more light emitting diodes (LEDs), organic light emitting diodes (OLEDs), lasers, or other lighting elements, and different spectral channels 110 may respectively contain different types of lighting elements that have different emission characteristics, e.g., respective light emission spectra and/or degrees of collimation, polarization, or coherency. (Although FIG. 1 shows spectral channels 110-1 to 110-N as being spatially separate and separated, lighting elements associated with spectral channels 110-1 to 110-N may be mixed or interwoven across a light emitting area of luminaire 100.) The total illumination that luminaire 100 provides is generally a sum or combination of the light emitted from all of the spectral channels 110-1 to 110-N, and spectral channels 110 collectively may be configured and operated so that luminaire 100 emits a desired spectral power distribution for emitted light.

The emission spectrum of luminaire 100 generally covers a range of wavelengths that depends on the types of lighting elements employed in spectral channels 110-1 to 110-N and may, for example, cover a range including infrared, visible, and ultraviolet wavelengths. The number N of types of spectral channels 110-1 to 110-N required for luminaire 100 to cover a desired range of electromagnetic wavelengths generally depends on the desired range and the widths of the emitted spectra of spectral channels 110-1 to 110-N. In an exemplary embodiment, spectral channels 110-1 to 110-N may have three to ten, on the order of one hundred, or even more different colors or different peak emission wavelengths in a range from infrared to ultraviolet, and the peak emission wavelengths of spectral channels 110-1 to 110-N can be separated by steps that depend on the shapes of the respective spectral power distributions of spectral channels 110-1 to 110-N. For example, direct emission LEDs having single-peak spectra with a full width at half maximum (FWHM) of about 5 to 50 nm may provide a desirable spectral resolution and cover a range of wavelengths if the emission spectra have peak wavelengths separated by steps of about 5 to 50 nm. Phosphor-converted LEDs have wider spectral power distributions, i.e., larger FWHM, so that fewer spectral channels 110 may be needed to cover the desired wavelength range if some or all of spectral channels 110 are phosphor-converted LEDs, but channels with wider spectral power distributions generally provide lower resolution in reproduction of a desired spectral distribution.

Luminaire 100 may employ an optical device 115 to mix the light output from channels 110 or to control the divergence or directional distribution of light output from luminaire 110. For example, optical device 115 may include a frosted plate of a transparent material to mix light from spectral channels 110-1 to 110-N and provide more spatially uniform lighting that combines light from all channels 110-1 to 110-N. Other combination methods such as light guides, beam splitters, reflectors, polarized reflectors, refractors, lenses, nano-diffusers or other nano-structures may also be used in optical device 115. In some implementations, optical device 115 may be dynamically operable to alter the divergence or directional character of light output from luminaire 100.

Illumination capabilities of luminaire 100 such as the intensity range, the spectral range, the range of available color temperatures, the gamut, the directionality, and the angular distribution of illumination from luminaire 100 generally depend on the specific choices of the number N of spectral channels 110, the types of lighting elements in spectral channels 110, the number of lighting elements of each type, and the types and arrangement of elements in optical device 115. The illumination emitted from luminaire 100 depends on those illumination capabilities and on how the illumination capabilities are controlled or programmed. In the illustrated embodiment, luminaire 100 contains a controller 120 that operates a programmable driver 130 to individually adjust the intensity of light emitted from each of spectral channels 110-1 to 110-N. In particular, the respective intensities emitted from spectral channels 110-1 to 110-N can be independently adjusted to provide lighting that approximates any desired spectral power distribution over the covered range of wavelengths of spectral channels 110-1 to 110-N. Driver 130, for example, may dim or otherwise control the radiation emitted from each of spectral channels 110-1 to 110-N by controlling the applied electrical power, e.g., by pulse width modulation (PWM), amplitude modulation (AM), or direct digital synthesis of the drive signal waveforms applied to the lighting elements of the respective spectral channels 110-1 to 110-N.

Controller 120 may process illumination data 162 and device data 166 to determine how to operate driver 130. Illumination data 162 in particular may represent a desired spectral power distribution of light emitted from luminaire 100, a desired spatial distribution or collimation of light emitted from luminaire 100, and variations over time in the spectral and spatial distributions. For example, U.S. patent application Ser. No. 13/046,578, entitled "Luminaire System," which is hereby incorporated by reference in its entirety, describes how illumination data may be formatted as a script for the controller of a luminaire, and the script may include executable code that a controller executes to control the evolution of lighting from the luminaire. Optionally, controller 120 may include an illumination content translator 400 that translates illumination data 162 to a form specific to luminaire 100.

Illumination data 162 may be stored in a memory or storage 160 or may be available as needed from an external source, e.g., from local network storage or from cloud storage or a service, accessible through a communication interface 150. For example, the illumination data can be streamed or otherwise input into luminaire 100 through communication interface 150 for on-the-fly control of the light emitted from luminaire 100. In an exemplary embodiment, communication interface 150 connects luminaire 100 to a network that may include similar luminaires or control devices, e.g., a light player, and can further be part of a user interface that allows a user to control luminaire 100, for example, to select lighting for an environment containing luminaire 100. Storage system 160 may be any type of system capable of storing information that controller 120 can access. Such systems include but are not limited to volatile or non-volatile IC memory such as DRAM or Flash memory and readers for removable media such as magnetic disks, optical disks, or Flash drives.

Illumination data 162 could have a variety of different formats suitable for representing the desired lighting. In one implementation, illumination is represented using one or more "illumination frames" or one or more sequences of illumination frames, where each illumination frame includes a representation of a spectral power distribution. Illumination data 162 may further include or represent collimation information and directional information for the illumination, for example, to represent a diffuse blue sky or collimated sunlight from a specified direction. For a multi-luminaire system, the illumination data may be partitioned into "tracks" corresponding to different luminaires or different sets of luminaires and may provide information indicating multiple points of origin of illumination based on the locations of the luminaires in the illumination system.

Device data 166 may indicate the characteristics of luminaire 100. Such characteristics of luminaire 100 may include, for example, an identifier for luminaire 100, a maximum or nominal frame rate of luminaire 100, the number N of spectral channels 110 in luminaire 100, data indicating the respective spectral power distributions of light from spectral channels 110, maximum intensities from the respective channels 110, and the response of each channel 110 to current, temperature, or other operating parameters of luminaire 100, and information indicating the position or orientation of luminaire 100 relative to other light sources or to a reference point for an illumination system incorporating luminaire 100. Device data 166 may be used internally in luminaire 100, e.g., by controller 120 when controller programs driver 130, or externally, e.g., when luminaire 100 communicates its capabilities to an illumination system incorporating luminaire 100.

Luminaire 100 may further include a sensing unit 170 for sensing characteristic of the environment that may be lit by luminaire 100 and sensing other light sources, which may be also be lighting the environment. Sensing unit 170 may, for example, include a spectrometer, a plurality of optically filtered photodetectors, a positional sensor, a camera, or other light sensors specific to a desired illumination experience or electromagnetic event. Sensing unit 170 may further sense or distinguish the direction of light being measured, and in a specific embodiment, may measure the location of or a direction to a light source in the environment. For example, environmental sensing may include an optical system that directs light from different directions onto different sensors in a sensor array, e.g., a camera with a wide angle lens and a pixel array. As described further below, such directional sensing may be used in processes that determine the locations of luminaires in an illumination system, e.g., for setup or commissioning of a multi-luminaire illumination system.

An emitted light sensing unit 180 may be used to measure the light emitted by luminaire 100. Light sensing unit 180 may differ from environment sensing unit 170 in that emitted light sensor 180 may be configured to isolate and measure light from spectral channels 110-1 to 110-N, while environment sensing unit 170 may measure light from the environment surrounding luminaire 100. Emitted light sensor 180 may be particularly useful for calibration of luminaire 100 or for observing or monitoring the over-time performance of spectral channels 110-1 to 110-N. Alternatively, either light sensing unit 170 or 180 may perform both environmental sensing and emitted light sensing (if desired).

Luminaire 100 may be programmed to produce illumination with any spectral power distribution that is within the covered wavelength range and the intensity and resolution limits of spectral channels 110-1 to 110-N. Luminaire 100 may further be used in an illumination system with other light sources that are spatially distributed to facilitate production of desired spatial or directional patterns in lighting. Each of the characteristics of the lighting may be subject to temporal variations. The time scales for such variation may be slow or fast relative to human perception or for whatever receptor is appropriate for the electromagnetic event. For example, lighting that reproduces or approximates the path of solar illumination from dawn to dusk may include spatial, spectral, directional, collimation, and intensity variations that slowly evolve over the course of a day. Lighting that reproduces or approximates the spatial, spectral, directional, collimation, and intensity patterns of a lightning strike could include spatial, spectral, directional, collimation, and intensity variations within a fraction of a second. Illumination systems may play such illumination content at faster or slower speeds and may match or synchronize illumination with other media presentations, e.g., with one or more audio and or video tracks, games, simulations, or any other accompanying events.

Figure 2A:
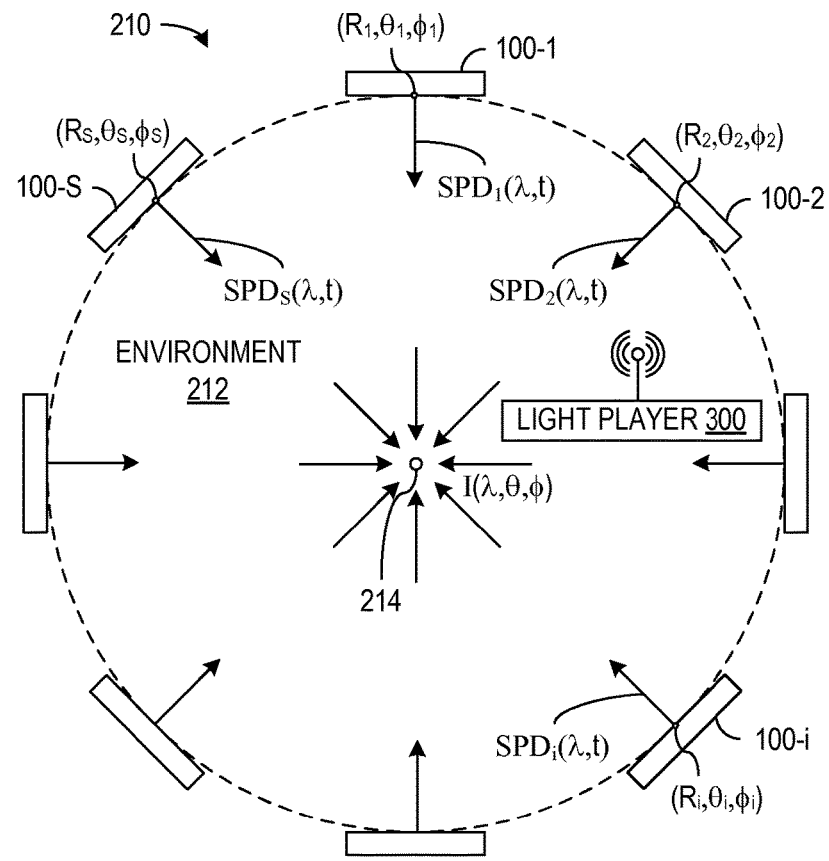
FIG. 2A illustrates an implementation of an illumination system employing light sources configured to illuminate a specified location within an illuminated environment.

Luminaire 100 by itself may constitute an illumination system for an environment. However, an illumination system including multiple light sources that are spatially distributed in an environment may be better able to more accurately play back lighting with different spatial/directional distributions or variations. FIG. 2A, for example, shows one illumination system 210 that provides lighting or illumination in an environment 212 using multiple light sources 100-1 to 100-S. Light systems 100-1 to 100-S may operate cooperatively and may be under the control of a master unit, e.g., a light player 300, under user control via an application available on a computer or a mobile device communicating with light systems 100-1 to 100-S, under the control of any one of light sources 100-1 to 100-S, or under distributed control through a peer-to-peer network of light sources 100-1 to 100-S. The number S of light sources or luminaires 100-1 to 100-S that work together to illuminate environment 212 can be any positive integer. In general, light sources 100-1 to 100-S may all be completely different or all be substantially identical and may or may not be multi-channel light sources similar to luminaire 100 of FIG. 1. In FIG. 2A, each luminaire 100-i for i from 1 to S has a position that may be given by spherical coordinates $(R_i, \theta_i, \phi_i)$ relative to a reference point 214. In one real or virtual implementation of system 210, luminaires 100 may be arranged uniformly on a surface of the sphere enclosing environment 212 and centered on point 215, i.e., the radial coordinate $R_i$ has the same value R for the locations of all luminaires 100-i, and each luminaires 100-i may be oriented to face toward reference point 214. The light output from a luminaire 100-i (for i from 1 to S) toward reference point 214 may be represented by a spectral power distribution $SPD_i(\lambda, t)$, which is a function of wavelength $\lambda$ and time t, and the resulting illumination at reference point 214 can be represented using a power density function $I(\lambda, \theta, \phi, t)$ indicating the intensity of light of wavelength $\lambda$ reaching location 214 at time t from a direction corresponding to angular coordinates $\theta$ and $\phi$. In an idealized system at a limit where the number S of luminaires 100-1 to 100-S is large and the size of each luminaire 100-i is small compared to radius R, illumination system 210 can accurately reproduce any illumination $I(\lambda, \theta, \phi, t)$ of point 214 if each luminaire 100-i, for i from 1 to S, sufficient spectral resolution, specifically if each luminaire 100-i is capable of producing a spectral power distribution $SPD_i(\lambda, t)$ with the desired shape and intensity of illumination $I(\lambda, \theta_i, \phi_i, t)$, where $\theta_i$ and $\phi_i$ correspond to the position of luminaire 100-i. In a real system, the illumination $I(\lambda, \theta, \phi, t)$ that can actually be achieved at point 214 may be limited at least by the number S of luminaires 110 and by the maximum intensity and the accuracy or resolution at which each luminaire 100-i can reproduce target spectral power distributions. Further, while illumination system 210 may accurately reproduce any desired illumination $I(\lambda, \theta, \phi, t)$ at point 214, illumination system 210 may not necessarily produce illumination that has desired characteristics at points other than point 214.

The exemplary implementation of illumination system 210 may be difficult to physically implement with light sources 100-1 to 100-N uniformly distributed on a sphere. Often, illuminated environments such as rooms include flat surfaces such as ceilings, walls, and floors that are not convenient for spherical arrangements, and mounting light sources on some available surface such as a floor may be inconvenient, e.g., in the way of walking or other activities. However, illumination system 210 may be precisely defined and characterized and if implemented could playback almost any lighting at a single point 214 as mentioned above. Even if illumination system 210 is not implemented anywhere, illumination system 210 may still be a useful "virtual" illumination system, and as described further below, illumination content may be created for a convenient virtual illumination system such as system 210 and then translated for playback in other illumination systems.

Figure 2B:
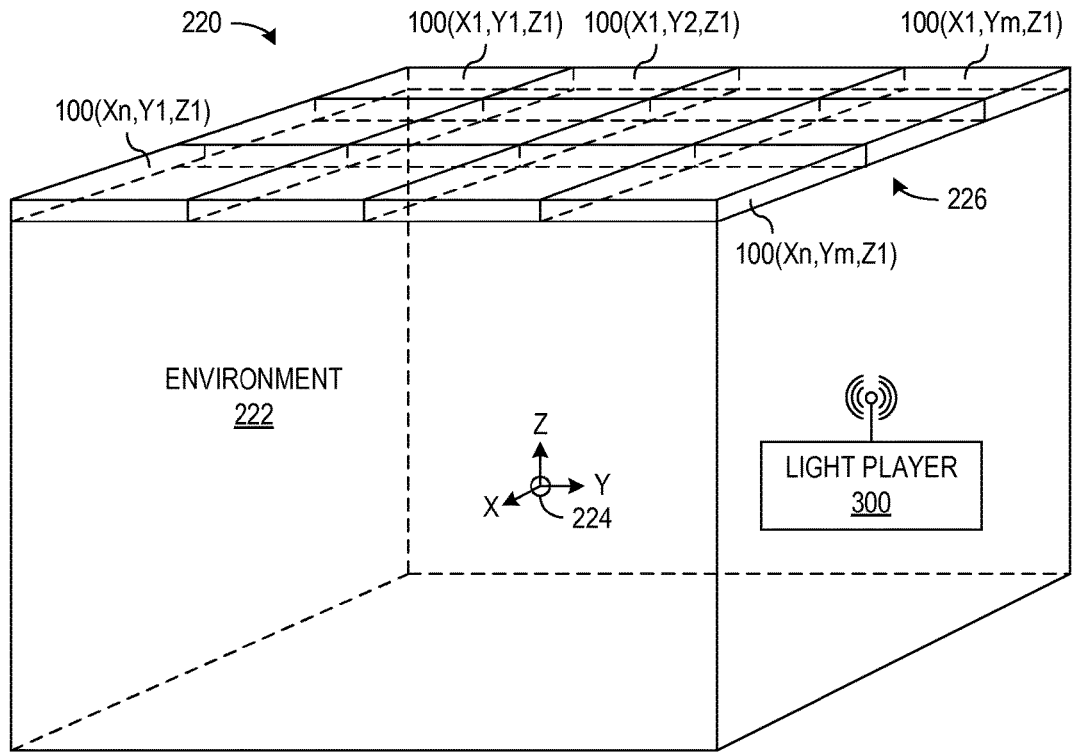
FIG. 2B illustrates an implementation of an illumination system having multiple light sources arranged in a planar array.

FIG. 2B shows an illumination system 220 that provides illumination for an environment 222 using a overhead lighting array 226 including light sources 100(X1,Y1,Z1) to 100(Xn,Ym,Z1) that may be under the control of a light player 300. Lighting array 226 is an n-by-m array of light sources 100(X1,Y1,Z1) to 100(Xn,Ym,Z1) mounted at a uniform height Z1, e.g., in or on a ceiling of environment 222. (Similar arrays of luminaires could be mounted on one or more wall or even the floor of an environment.) In one implementation, light sources 100(X1,Y1,Z1) to 100(Xn,Ym,Z1) may be provided together as a unit with or without an integrated light player 300, or light sources 100(X1,Y1,Z1) to 100(Xn,Ym,Z1) may be available as separate luminaires adapted for assembly into arrays of different sizes and for use with different types of light players 300. Each of light sources 100(X1,Y1,Z1) to 100(Xn,Ym,Z1) may be a multi-channel luminaire substantially identical or similar to luminaire 100 of FIG. 1 and may all be substantially identical to each other or may be different. In particular, light sources 100(X1,Y1,Z1) to 100(Xn,Ym,Z1) may include luminaires with different directional characteristics. For example, a fraction of the luminaires in this array may produce collimated light to approximate sunlight, while the other luminaires in the array produce diffuse light to approximate blue sky. The spatial configuration of light sources 100(X1,Y1,Z1) to 100(Xn,Ym,Z1) in FIG. 2B limits system 220 to producing direct illumination from generally above a reference point 224 in environment 222, but such limitation may not be significant if most desired illumination of environment 222 is predominantly from above.

Illumination system 220 also illustrates an example of a system that may be at least to some extent standardized. In particular, the spacing and capabilities of light sources 100(X1,Y1,Z1) to 100(Xn,Ym,Z1) may be determined during manufacture of the light sources, and even the mounting height Z1 may be according to a design specification or one of several design options for luminaires 100(X1,Y1,Z1) to 100(Xn,Ym,Z1). Accordingly, significant characterization of illumination system 220 may be according to a standard or factory specification and may be the same as any number of other illumination systems that employ the same array of light sources 100(X1,Y1,Z1) to 100(Xn,Ym,Z1). Thus, lighting content created or translated for use in system 220 might also be used in any number of other illumination systems using the same type of array 226.

Figure 2C:
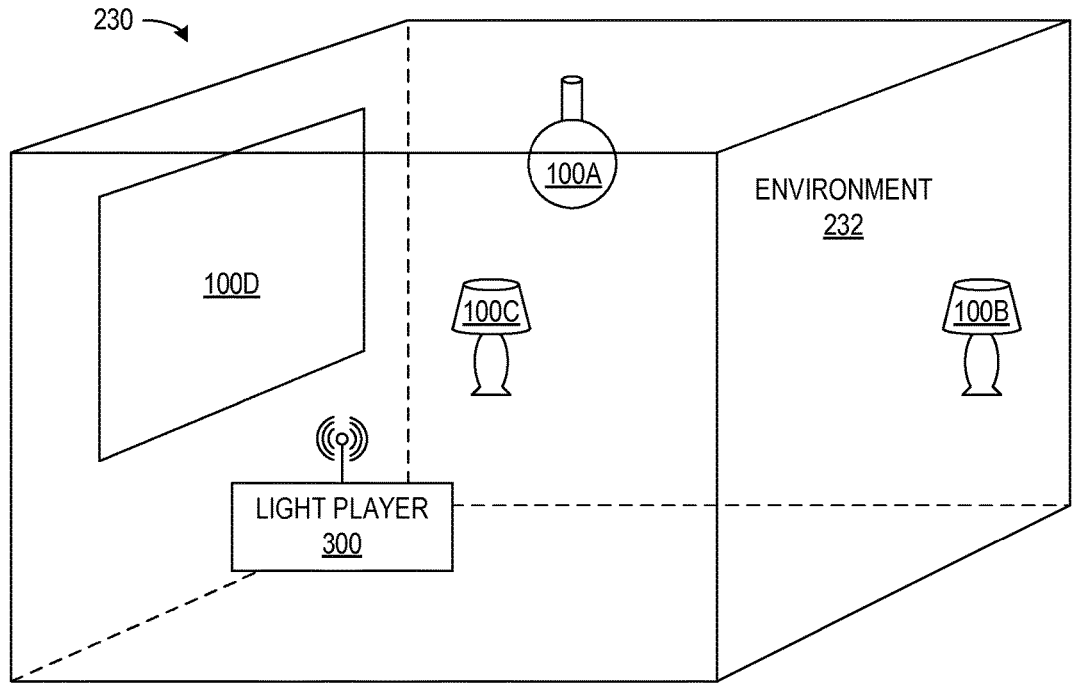
FIG. 2C illustrates an implementation of an illumination system with a custom arrangement of light sources.

FIG. 2C shows an illumination system 230 that may provide illumination for an environment 232 using an ad hoc, professionally designed, or other custom assembly of light sources 100A to 100D. Light sources 100A to 100D may be a combination of different types of light sources that may be arranged in a manner that is unique to system 230. In one implementation, one or more light sources 100A to 100D may be programmable for cooperative operation with other light sources 100A to 100D under the control of a light player 300, and one or more of light sources 100A to 100D may not be programmable or otherwise under the control of light player 300. For example, one or more light source 100A may be a multi-channel, programmable luminaire capable of reproducing a desired spectral power distribution and may have an interface for communications with light player 300 or other light sources. Another light source 100B or 100C may have limited electronic control of characteristics such as intensity, time of day awareness, or spectrum, e.g., a fixed spectrum lamp with an network controlled dimmer, and other light sources 100D may produce light over which light player 300 has little or no control, e.g., a window without electronic shades or spectral filtering. The variety of types of light sources that may be used is unlimited, but some examples of suitable luminaires 100A to 100D may include upper/lower wall luminaires, torchiere/projector luminaires to up-light ceilings or highlight objects, and desk/table lamps. A regularly spaced grid such as ceiling array 226 of FIG. 2B or a flat/thin wall luminaires that resemble windows could be employed in system 230 in combination with other types of luminaires.

Figure 3A:
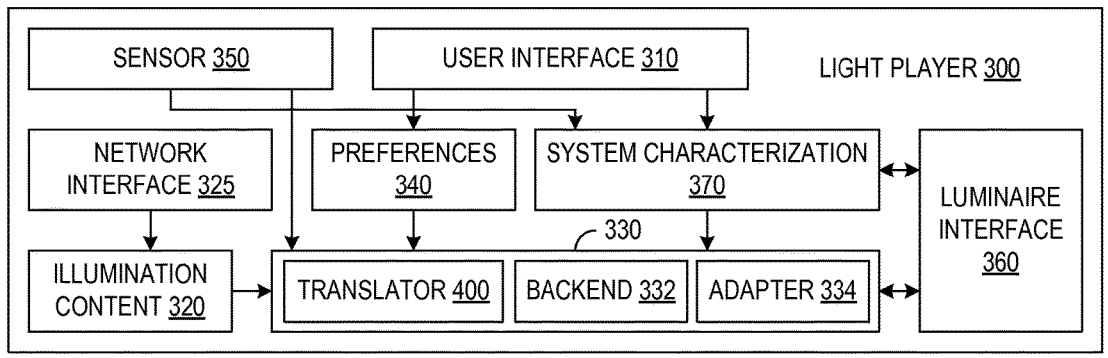
FIG. 3A is a block diagram illustrating functional modules in one implementation of a light player.

Each of illumination systems 210, 220, and 230 of FIGS. 2A, 2B, and 2C may include a light player 300 that coordinates the light emissions from luminaires of the illumination systems in order to produce the desired illumination of the illuminated environments. In general, light player 300 may be a separate device, e.g., special purpose hardware or a computing system executing light player program, or may be implemented within one or more of the luminaires in the illumination system. FIG. 3A illustrates the modules in one implementation of light player 300. As shown in FIG. 3A, light player 300 generally provides a user interface 310 allowing a user to control illumination in an environment of player 300 and operates on illumination content 320 that the user may select. For example, a user may select illumination content 320 from a library of illumination content, which may be stored in player 300 or available through a network interface 325, and may further operate user interface 310 to control playing of the content. Selected illumination content 320 may particularly be embodied as media storing one or more lumenscripts or other illumination data/commands or a memory that buffers a lumenscript or other illumination data/commands corresponding to illumination to be played in the environment of player 300.

Figure 3B:
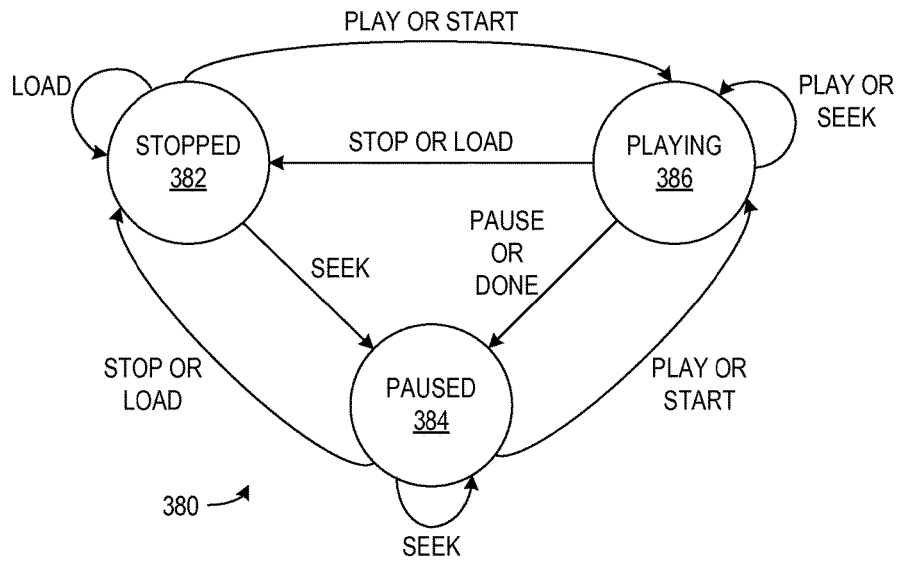
FIG. 3B illustrates one implementation of a state machine and/or the user interface controls for an illumination player.

Control functions for light player 300 may be similar to control functions in media players such as video or audio players. For example, user interface 310 may allow a user to select, start, pause, or stop playing of illumination content. FIG. 3B shows a state diagram 380 for one implementation of user control of illumination player 300. State diagram 380 shows three operating states, stopped 382, paused 384, and playing 386. In stopped state 382, player 300 turns the luminaires in the illumination system to dark or off. In paused state 384, player 300 controls the luminaires in the illumination system to produce a default illumination, e.g., so that the environment isn't dark. In playing state 386, player 300 operates luminaires in the illumination system to produce illumination corresponding to user-selected illumination content, e.g., to provide illumination described by an illumination frame at a current time index in the selected script. It may be noted that some control conventions for a light player may differ from convention for other media players. For example, one convention for "pause" in an audio player turns off the sound, but the convention for light player 300, may be that light stays on or shifts to a standard lighting when illumination content is paused.

A user may use user interface 310 to issue commands and control operation of light player 300, for example, to change the operating state of player 300 or to manipulate or select illumination content and a time index in illumination content. Upon power up or receipt of a "RESET" command, hardware associated with player 300 may be initialized or re-initialized, a current time index may be set to its initial value, e.g., zero, and a current script may be set to a default script, e.g., the first script available from illumination content 320 or "NULL" if no valid script can be found. If a valid current script has been selected, a "play" or "start" command can switch player from stopped or paused state 382 or 384 to playing state 386 so that the current script plays beginning at the current time index. A "stop" command shifts player 300 from playing state 386 or paused state 384 to stopped state 382. A "pause" command (or a script being done or finishing its final frame or time index) shifts player 300 from playing state 386 or stopped state 382 to paused state 384.

When player 300 is in paused state 384 or playing state 386, a user may initiate a "seek" command to change a current time index in the current script, and player 300 may remain in paused state 384 or 386 during execution of the seek command. A user may initiate a "load" command to select illumination content, e.g., change the current script.

For playing illumination, an illumination processor 330 of FIG. 3A processes the current illumination content to generate commands/data for the luminaires in the illumination system. Illumination processor 330 particularly includes a player backend 332 for implementing the operating states and user command, which may be received through user interface 310. Illumination processor 330 may further include a translator that translates illumination content 320 for playing in the illumination system of player 300. As described further below, if illumination content 320 is in a form for playing on another illumination system, e.g., a standardized illumination system, a translator 400 may translate illumination content 320 for playing on the illumination system associated with light player 300. Translation may require information characterizing the capabilities and configurations of the luminaires in the illumination system, and the illustrated embodiment of player 300 includes a system characterization module 370 capable of collecting or storing characterizing information for translator 400. If illumination content 320 is already adapted for the illumination system of light player 300, illumination processor 330 may omit translator 400.

The illustrated embodiment of illumination processor 330 also includes an optional adapter module 334 that may modify the illumination content to change illumination produced in the environment of light player 300. Adapter 334 may particularly modify illumination based on user instructions or preferences 340, illumination system or environmental measurements, or learning algorithms. Preferences 340 may, for example, indicate a desired maximum or minimum intensity for environmental illumination. One or more sensors 350 associated with player 390 or sensors associated with the luminaires may also provide input so that adapter 334 can modify the environmental illumination based on real-time measurements of the environment. Adapter 334 may also take into account the (static) system-wide directionality and placement information on illumination sources and environmental reflection in addition to real-time environment measurements and user instructions. The operations that adapter 334 performs to modify illumination content may be similar or identical to some illumination editing operations, which are described further below.

Figure 3C:
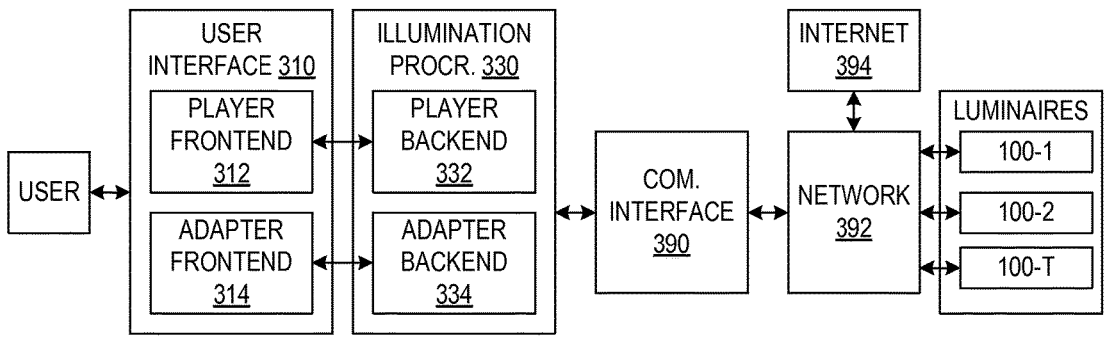
FIG. 3C is a block diagram showing functional units in an illumination system providing a user interface for control of a light player including an illumination adapter.

The light player 300 of FIG. 3A includes a luminaire interface 360 for communications with the luminaires in the illumination system. Player 300 may, for example, send commands or illumination data from illumination processor 330 to the luminaires or may receive measurements or performance information from the luminaires. In one specific implementation, luminaire interface 310 implements a wireless communication protocol such as WiFi or Bluetooth for direct communication with the luminaires in the illumination system or communications via an intervening network and network devices. In some configurations, luminaire interface 360 and network interface 325 may be parts of a combined communication interface of light player 300. FIG. 3C, for example, illustrates an illumination system configuration in which illumination processor 330 communicates with luminaires 100-1 to 100-T of an illumination system via a communication interface 390 and a local network 392 that also provides a bridge or other connection to a remote or wide area network such as the Internet.

Accordingly, in the configuration of FIG. 3C, a light player can communicate with luminaires and access remote illumination content through the same communication interface 390.

FIG. 3C also illustrates how a user 310 can interact with user interface 310 to input player control commands via a player front end portion 312 of user interface 310 and input editing commands or illumination preferences via an adapter front end portion 314 of user interface 310. The player control commands, e.g., play, pause, load, or seek, may control the operating mode that a player backend 331 implements, while the editing commands or illumination preference may control how adapter 334 may modify illumination content according to a user's preferences for the illumination system.

Illumination systems in general may have different capabilities and may provide different fidelity when playing illumination. For example, an illumination system containing a single luminaire such as luminaire 100 of FIG. 1 may be able to reproduce spectral content of illumination but may not be able to accurately reproduce the spatial distribution of the illumination. Illumination system 210 of FIG. 2A, on the other hand, may be able to accurately reproduce the desired spectral and directional characteristics of illumination at point 214 with fidelity or resolution limited only by the number S of light sources 100-1 to 100-S and the intensity or spectral resolution limitations of the light sources 100-1 to 100-S. Similarly, illumination system 210, which is not limited to overhead lighting, may mimic table top lighting such as candlelight, fireplace illumination, or lighting from below such as light reflected or originating from a body of water, while overhead illumination system 220 of FIG. 2B may be unable to accurately reproduce illumination rising from lower directions. Still, illumination system 220 may accurately reproduce any overhead illumination with fidelity or resolution limited only by the size of the luminaire array 226 and the spectral resolution of individual light sources 100(X1,Y1,Z1) to 100(Xn,Ym,Z1). The more general case such as illumination system 230 of FIG. 2C may have an irregular distribution of light sources and fidelity and resolution limitations that a creator of illumination content may be unable to predict. Despite the difference in such illumination systems, in accordance with an aspect disclosed herein, a universal illumination content translator can convert illumination content that was created for playback in a (source) system for playback in another (target) system.

The illumination content translator generally operates on source illumination content (however created) to produce translated illumination content. The source illumination content may be in a form that is independent of the capabilities of any illumination system or may be in a form suited for a real or virtual illumination system having defined capabilities known to the translator. (A virtual illumination system is a system that has well defined lighting capabilities but that may not be implemented anywhere and may even be impractical for implementation. For example, with existing technology, illumination system 210 of FIG. 2A having light sources 100-1 to 100-S of small size and high spectral resolution may be impractical to implement when the number S of luminaires is particularly large, but regardless of the number S, illumination system 210 may have a defined configuration and defined capabilities.) Whether the source illumination content is in a form for a real or virtual illumination system or a form that is illumination system independent, a translator may still translate the illumination content from its source form to a translated form suitable for playing in a target illumination system. More generally, a universal translator may translate source illumination content for use in any target illumination system having any number of luminaires of any types and at any locations provided that the characteristics of the target illumination system are known/defined.

Figure 4A:
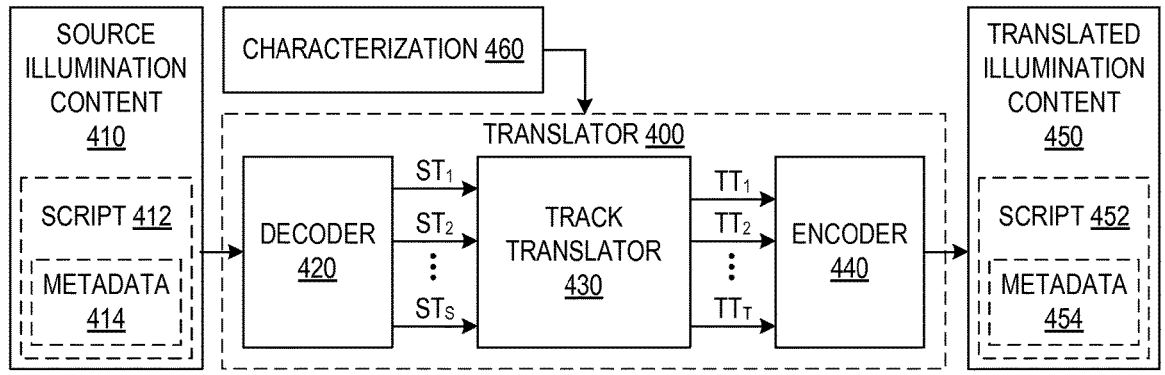
FIG. 4A is a block diagram illustrating one implementation of an illumination content translator.

FIG. 4A is a block diagram illustrating the functional modules used in the general operation of one implementation of an illumination content translator 400. Translator 400 may be implemented in a computer system executing suitable software or firmware or may be implemented in custom hardware specifically designed to perform the processes described herein. For example, translator 400 when incorporated in a luminaire may be implemented in hardware or firmware that is tailored to or for the luminaire. In the implementation described above with reference to FIG. 3A, translator 400 may be associated with a light player such as light player 300, and illumination content may be provided to the light player in a standardized form. The translator 400 associated with a light player 300 may translate the standard illumination content to produce translated illumination content providing data, parameters, or instructions for the specific luminaires in the illumination system of the light player 300. In another implementation, portions of translator 400 may be distributed among and executed in the luminaires of a target illumination system, and the portion in each luminaire of the target illumination system may translate a portion or track of the illumination content that is associated with that luminaire. In still another implementation, translator 400 operates as a service, e.g., a cloud service available on the Internet, that provides translated illumination content to the target illumination system or specific luminaires in the illumination system. A hierarchical translating system may also employ translations at multiple levels. For example, a translator at a service level may provide translated illumination content to a light player, a translator associated with the player may further translate or spatially interpolate illumination content for transmission of one or more tracks to respective luminaires, and translators associated with the luminaires may translate illumination content as needed for the luminaire to emit illumination.

Source illumination content media 410, which contains illumination content to be translated, may be embodied as media, memory, or another physical device capable of providing a lighting file or script, data, or commands representing the lighting that corresponds to the illumination content. In the illustrated implementation, source illumination content media 410 provides a script 412, sometimes referred to herein as a Lumenscript®, which corresponds to desired illumination and incorporates commands and data formatted so that a source system can interpret script 412 to produce or approximate the desired illumination. In general, translator 400 may operate in real time, e.g., may operate as information from script 412 as streamed or otherwise transmitted to translator 400, or script 412 may particularly contain or provide a data structure that translator 400 pre-processes to create translated illumination content media 450. Translated illumination content media 450 may similarly be embodied as media, memory, or another physical device that stores or provides a lighting file or script, data, or commands to be played on a target system to playback the lighting that corresponds to illumination content from media 410. In the illustrated implementation, translated illumination content media 450 provides a script or lumenscript 452, which corresponds to desired illumination and incorporates commands and data formatted so that the target system can interpret script 412 to produce or approximate the desired illumination. It may be noted that playback or reproduction of the lighting that corresponds to the illumination content generally involves an approximation, and the quality of the approximation for the translated illumination content may depend both on the configuration and capabilities of the illumination system and the quality of the translation.

Many different formats are possible for scripts 412 and 452, and translator 400 includes a decoder module 420 that decodes script 412 (or metadata 414 from script 412) to produce a set of source tracks $ST_1$ to $ST_S$. Each source track $ST_1$ to $ST_S$ represents the evolution of the spectral power distribution emitted from a light source having a known location and orientation in the source illumination system. Each source track $ST_1$ to $ST_S$, for example, may be a stream or sequence of illumination frames, where each illumination frame represents a fixed or variable spectral power distribution that the light source associated with that source track emits at a time or times associated with the frame. Translator 400 further includes a track translator 430 that processes source tracks $ST_1$ to $ST_S$ to create translated tracks $TT_1$ to $TT_T$. Each translated track $TT_1$ to $TT_T$ may correspond to a light source in the target system and may, for example, represent a stream of frames representing a fixed or variable spectral power distributions that the corresponding light source in the target illumination system is to generate. An encoder module 440 may process tracks $TT_1$ to $TT_T$ to provide a translated script 452 having a format suitable for the target illumination system.

FIG. 4A shows an example in which the source illumination content includes S tracks $ST_1$ to $ST_S$, which correspond to light sources at S locations, and the target illumination system includes T tracks $TT_1$ to $TT_T$, which correspond to light sources at T locations. The numbers S and T of light sources may be the same or different. In either case, the locations of light source associated with tracks $ST_1$ to $ST_S$ do not necessarily map to one-to-one to the light sources in the target system. For example, each source track $ST_1$ to $ST_S$ may be associated with a light source in a source illumination system and therefore associated with the characteristics of the light sources such as the locations of the light sources, and each target track $TT_1$ to $TT_T$ being associated with a light source in the target illumination system also associates tracks $TT_1$ to $TT_T$ with characteristics such as the locations of the associated light sources in the target illumination system. In general, for each light source in a source illumination system, the target illumination system may or may not have a light source at a corresponding location. Track translator 430 may thus need to map the operation of the S light sources to operation of the T light sources in the target system. Track translator 430 may particularly perform a spatial interpolation process as described further below so that playback of translated script 452 on the target illumination system approximates the spatial characteristics of the illumination that the source system would produce from source script 412.

Playing translated script 452 on the target system may only approximately provide the desired illumination if the target system has limited abilities. In one implementation, source script 412 or metadata 414 provides a high resolution representation of a desired spectral power distribution. For example, a "sampled" illumination frame may represent a spectral power distribution using a relatively large number of values, e.g., 81 values in one implementation, that are samples of the desired spectral power distribution respectively at specific light wavelengths, e.g., at 81 wavelengths. In contrast, translated script 452 may represent the desired spectral power distribution as a "compiled" illumination frame, which may represent a spectral power distribution as a set of drive levels for the spectral channels of the target system, e.g., five drive levels for a five-channel target luminaire. A compiled frame may thus accurately represent the best approximation of a desired spectral power distribution that the target illumination system can produce, but the compiled frame may still be a lossy compression of the desired spectral power distribution represented in source script 412 or in metadata 414. Further translation of an already translated script may, thus, further degrade of illumination quality. To avoid such degradation, encoding of translated script 452 may optionally include metadata 454 that provides a high resolution representation of the desired illumination in addition to illumination description encoded in a format that the target illumination system requires. Metadata 454 may, for example, be the same as or derived from metadata 414 in source script 412. If metadata 414 is available, decoder 420 may decode the metadata 414 to generate source tracks $ST_1$ to $ST_S$ that define the desired illumination more accurately than would source script 412 if source script 412 otherwise only contains frames compiled for a source illumination system.

Figure 4B:
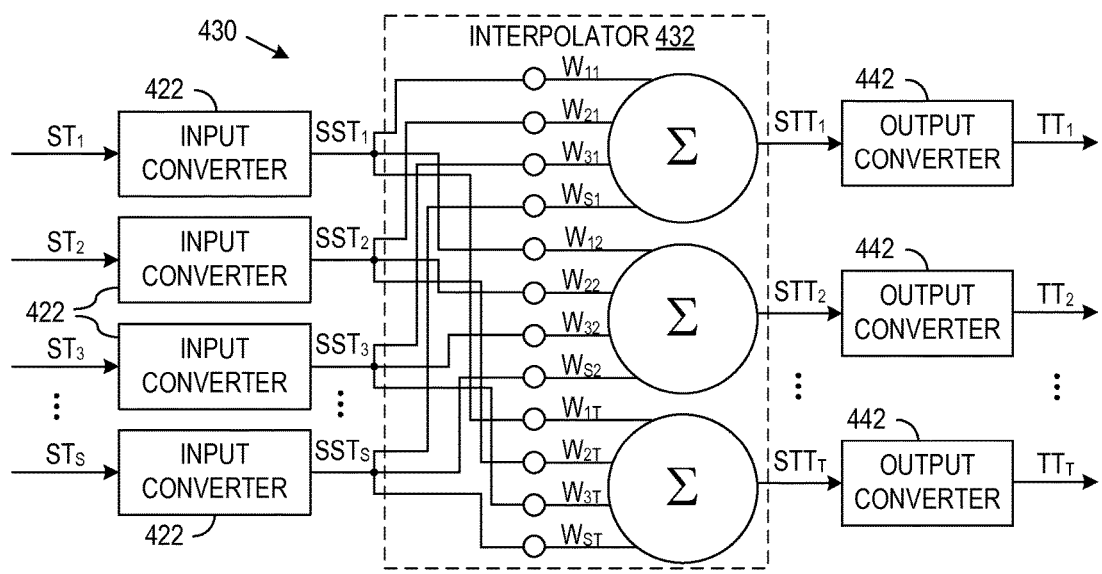
FIG. 4B is a block diagram illustrating functional modules in an implementation of an illumination track translator.

FIG. 4B illustrates the functional modules in one implementation of track translator 430. In the implementation of FIG. 4B, input converter modules 422 convert source tracks $ST_1$ to $ST_S$, which may use luminaire-specific formats, to standardized source tracks $SST_1$ to $SST_S$. All of the standardized source tracks $SST_1$ to $SST_S$ use the same representation of illumination. For example, in one specific implementation, each standardized source tracks $SST_i$ for i=1 to S contains a sequence of frames that are synchronized and use the same frame rate, and each frame uses the same method of representing a spectral power distribution corresponding to the frames. Standardized tracks $SST_1$ to $SST_S$ may simplify combining illumination that originates at the same time in different luminaires of the source system. Standardization may be needed because in general the luminaires corresponding to source tracks $ST_1$ to $ST_S$ may all be different, e.g., have different frame rates, different numbers of spectral channels, and different intensity scales. Standardizing a source track $ST_i$ may, for example, include changing the frame rate used in the source track $ST_i$ to a frame rate shared by all of the standardized source tracks $SST_1$ to $SST_S$, normalizing intensities so that all of the standardized source tracks $SST_1$ to $SST_S$ use the same standardized scale, and changing the representation of each frame in the source track $ST_i$ to a type of frame representation used by all of the standardized tracks $SST_1$ to $SST_S$. Standardization of tracks $ST_1$ to $ST_S$ may not be necessary if all of the luminaires in the source illumination system are the same or if tracks $ST_1$ to $ST_S$ already use the same representation of evolving emission spectra. In particular, tracks $ST_1$ to $ST_S$ may use the same representation of evolving emission spectra if the source illumination system is a virtual illumination system defined to contain identical luminaires or if tracks $ST_1$ to $ST_S$ use a representation that is independent of the illumination system.

A spatial interpolation module 432 operates on standardized source tracks $SST_1$ to $SST_S$ to produce standardized target tracks $STT_1$ to $STT_T$. Standardized target tracks $STT_1$ to $STT_T$ respectively correspond to the luminaires in the target illumination system and particularly represent the desired evolution of the emitted spectral power distribution from the luminaires in the target illumination system. In general, the number T of luminaires in the target illumination system may differ from the number S of luminaires in the source illumination system. Further, the relative positions of at least some of luminaires in the target illumination system may differ from the relative positions of luminaires in the source illumination system.

Module 432 may perform some form of spatial interpolation. A rough interpolation process may simply distinguish light sources in the source and target illumination system by categories. For example, the source illumination system may include nine upper or ceiling luminaires that are categorized as front-left, front-center, front-right, center-left, center-center, center-right, back-left, back-center, and back-right. The target illumination system may include luminaires that may be similarly categorized. If the target illumination systems has at least one luminaire that falls into each of the nine categories, the target light sources in each category can play lighting corresponding to the source light source in the same category. For example, the intensity and spectral power distribution of light from a source track corresponding to one category of luminaire may be distributed among tracks/luminaires of the same category in the target system. If the target system does not have a light source in a particular category used by the source tracks, interpolation can be used. For example, if the target illumination system has back-right and back-left ceiling luminaires but no back-center luminaire, the back-right and back-left target luminaires can together mimic the light from a back-center source luminaire, while also respectively playing the lighting associated with the back-right and back left source luminaires.

A more precise interpolation could be performed using measured positions or coordinates of the light sources in the source and target illumination systems. In particular, the position of each luminaire in a source illumination system when translated to an equivalent position in the target illumination system may or may not correspond to one of the locations of luminaires in the target illumination system. For interpolation, the equivalent position of the source luminaire can be identified as corresponding to a point in an area, e.g., a triangle, with vertices intersected by lines from a reference point to a set of, e.g., three, the luminaires in the target lighting, and playback of the light emitted from each luminaire the source system may be approximated by a combination of light from multiple luminaires in the target system. For each standardized target track $STT_i$, for index i from 1 to T, module 432 may determine each frame based on a weighted sum of the spectral power distributions from corresponding frames from standardized source tracks $SST_1$ to $SST_S$. Weight factors $W_{11}$ to $W_{ST}$ used in the weighted sums may be determined, for example, from the coordinates, categorization, or light dispersion characteristics of the source and target luminaires.

Output converter modules 442 can convert standardized target tracks $STT_1$ to $STT_T$ to forms suitable for or specific to the luminaires in the target illumination system. Conversion may be needed because in general the luminaires in the target system may not employ the standardized tracks and may all be different, e.g., have different ranges or quantization of intensity, different frame rates, and different numbers of spectral channels. Conversion of a standardized target track $STT_i$ may, for example, include changing the standard frame rate of standardized target track $STT_i$ to the frame rate used by the corresponding luminaire in the target illumination system and changing the representation of each frame in the standardized target track $STT_i$ to the type of frame representation used by the corresponding luminaire in the target illumination system. Converters 442 may not be necessary if all of the luminaires in the target illumination system are capable of interpreting standardized target tracks $STT_1$ to $STT_T$.

Track translator 430 during translation of source illumination content 410 for playing in a target illumination system may require information characterizing the locations and capabilities of the luminaires in source and target illumination systems. In particular, information characterizing source luminaires may be needed to determine how input converters 422 convert source tracks $ST_1$ to $ST_S$ into standardized source tracks $SST_1$ to $SST_S$. Information characterizing the positions, orientation, and light dispersion characteristics of the source and target luminaires may be needed to determine weight factors $W_{11}$ to $W_{ST}$, and information characterizing the target luminaires may be needed to determine how output converters 442 convert standardized target tracks $STT_1$ to $STT_T$ into target tracks $TT_1$ to $TT_T$. Translator 400 of FIG. 4A may receive such information from characterization module 460, which may obtain characterizing information according to a standard, e.g., a definition of the source system, or from measurements of one or both of the source and target illumination systems.

Such characterizing information for illumination systems may be necessary or useful for translating illumination content but may also assist systems and process for editing or playing illumination content. In particular, an editor or an adapter tailoring illumination content for a particular illumination system may need characterizing information to determine how to best modify the illumination content. Illumination content players, translators, and editors may thus need to take account of the variability in distribution or spacing, the light emission capabilities, and command or control capabilities of light sources in illumination systems. A further important factor for illumination playback is that illumination in an environment often includes uncontrolled light sources and light reflected from objects and surfaces in the environment, so that the illumination a user or any other receptor experiences is not solely dependent on the light sources of an illumination system. To provided the best results for illumination in a target environment, a light player, a translator, or an editing system may need information characterizing an illumination system and may further employ addition characterizing information for the illuminated environments.

Figure 5A:
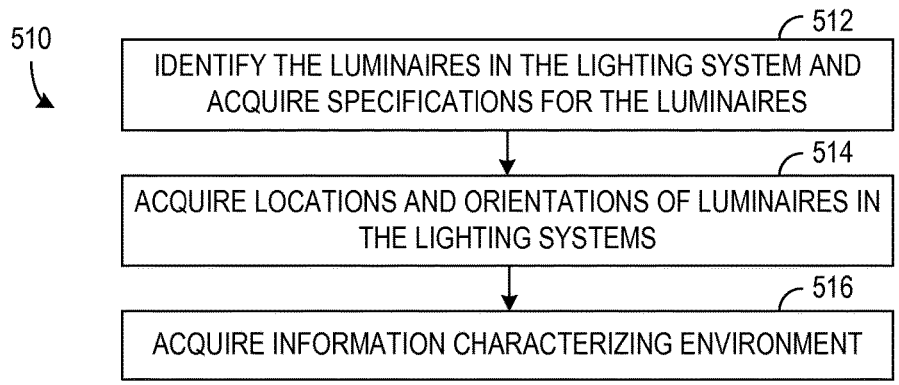
FIGS. 5A to 5F are flow diagrams illustrating processes for characterizing an illumination system.

Obtaining the characterizing information for an illumination system may employ automated or manual processes. FIG. 5A is a flow diagram for a process 510 for collecting characterizing information for an illumination system. In process 510, a block 512 represents a process for identifying the luminaires in an illumination system and acquiring luminaire data or specifications for each luminaire in the illumination system. One implementation of an illumination system as disclosed above incorporates luminaires in a wireless networks, and the luminaires in an illumination system may be identified using a network discovery. The specifications for each luminaire may indicate primary characteristics such as the number of spectral channels in the luminaire, the spectral power distribution of each spectral channel of the luminaire for a range of intensity control levels and emitter temperatures, the maximum intensities and granularity of intensity control for each spectral channel, and the polarization, divergence, or directional distribution characteristics of light emitted from the luminaire. The specification may further indicate characteristics of the luminaire such as any light steering capabilities, a time in use or since service, a serial number, and information defining the power consumption of each channel. A lighting control system, e.g., system characterization module 370 in light player 300 of FIG. 3A, may acquire luminaire specifications by querying the luminaires in an illumination system to obtain the specifications stored in luminaires that are able to respond to the queries. For example, luminaire 100 of FIG. 1 has communication interface 150, and controller 120 of luminaire 100 may be configured to reply to specific queries from light player 300 by providing device data 166 over a communication link between luminaire 100 and light player 300. Alternatively, an identifier for a luminaire, e.g., a model number or a serial number, may be used to obtain luminaire specifications from an external source such as web site, which a manufacturer of the luminaire may provide. In yet another alternative, a user may be able to enter a luminaire identifier or relevant luminaire specifications, e.g., using user interface 310 of light player 300. For example, if a luminaire in an illumination system is not able to transmit all relevant specifications to light player 300, user interface 310 may allow a user to manually enter a luminaire serial number or characterizing information, e.g., via network interface 325, graphic user interface (GUI) controls, or buttons, a keyboard, touch pad, or other input device associated with light player 300.

A process block 514 of process 510 acquires characterizing information indicating the positions and orientations of the luminaires in the illumination system. Characterizing the positions of light sources in an illumination system is particularly important for translation of illumination content that may be played using multiple luminaires. For example, for the implementation of track translator 430 shown in FIG. 4B, the correct values of weighting factors $W_{11}$ to $W_{ST}$, e.g., values of weighting factors $W_{11}$ to $W_{ST}$ that produce translated illumination coming from the same relative directions as represented in the source illumination content, depend on the positions of luminaires in the target illumination systems. A high degree of accuracy for the position information may not be required, and position information that indicates relative positions of the luminaires may be sufficient for some illumination content. Execution of block 514 to acquire position and orientation information may solely involve automated processes of luminaire interactions or may require user measurements or other user actions. In some cases, location data may be extracted from or provided by building information modeling (BIM) software or other software packages used for design, construction, operation, or maintenance of the illumination system or a building environment. Often however, such building models do not exist and/or are inadequate for the needs of a light player or a translator. For example, a building model created for a purpose other than describing the locations of light sources may allow what would be gross errors in a translation process.

In some illumination systems, e.g., systems 210 and 220 of FIGS. 2A and 2B, the relative locations and orientations of a set of luminaires may be fixed or set according to factory specifications, may be accurately determined with minimal measurements, or may be determined by querying the illumination system or an external source. However, lighting installations may include many different types, distributions, and orientations of light sources. Several different ways to acquire luminaire locations and positions are described below.

Position and orientation information acquired in process block 514 may be used to construct a map of the luminaires of the illumination system. The map of luminaires may, for example, be a list of entries where each entry corresponds to a luminaire in the illumination system mapped and gives the location of the luminaire. Each luminaire entry in the map may further indicate the orientation and operating characteristics of the luminaire. The locations may be sparse or irregular, but a map may inform a translator of how to distribute the illumination content over time and space. For example, given a map of the target illumination system and a map of the source illumination system, characterization module 460 in the embodiment of FIG. 4A can derive weights $W_{11}$ to $W_{ST}$ for the spatial interpolation as in FIG. 4B.

Figure 5B:
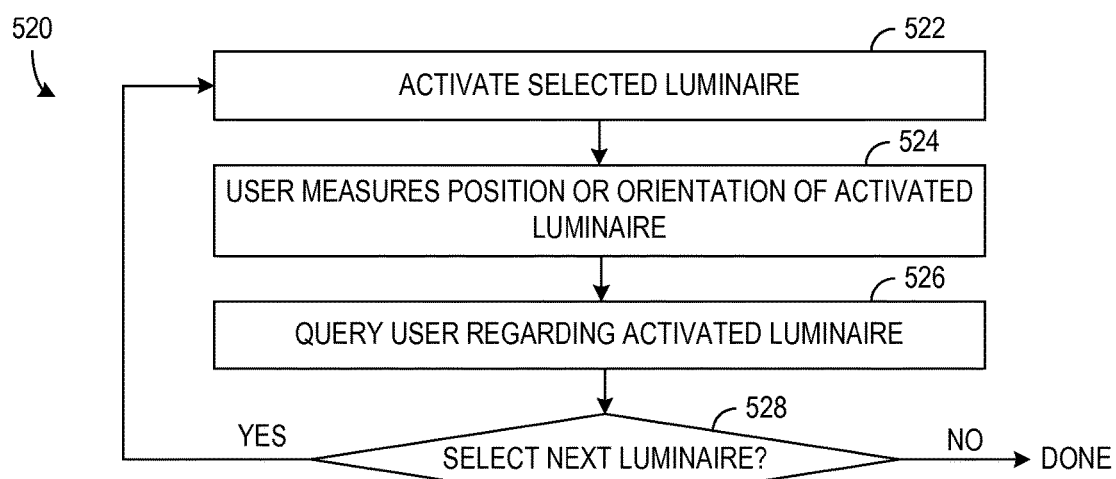

FIG. 5B illustrates one implementation of a process 520 for mapping the luminaires of an illumination system. In process 520, a device such as a light player that has identified the luminaires in the lighting can execute a process block 522 by visibly activating a selected one of the luminaires. Visibly activating a luminaire may, for example, turn on light emissions from the selected luminaire while other luminaires are dark or may command the selected luminaire to blink or emit light with a characteristic color to distinguish the selected luminaire from the other luminaires in the illumination system. A user performing process block 524 can then measure the position or orientation of the luminaire, and the light player executing block 526 can query the user for input of the measurement results. Process 520 may branch from decision block 528 back to process block 522 to visibly activate a next luminaire in the illumination system and repeat processes 522, 524, and 526 until position or orientation information has been acquired for all of the luminaires in the illumination system.

The measurements a user performs in block 524 can be accomplished in many ways. In one implementation, a user may observe a luminaire and categorize the position or orientation of the luminaire based on the observation. For example, a user my view the position of the luminaire within an environment and select one or more categories for the luminaire from a list of available position or orientation categories. For example, a luminaire may be categorized as ceiling-back-left, right-wall-middle, front-wall-lower, or south-wall-upper or facing downward, facing upward, facing left, facing right, facing frontward, or facing backward. Categories may similarly use compass directions such as north, south, east, or west (e.g., in place of front, back, right, or left) to indicate a luminaires position or the direction that a luminaire faces. Alternatively, a user may measure a position or orientation of a luminaire using a measuring device such as a tape measure, a GPS device, a smart phone, or a laser measuring device. For example, a user interface of a light player may instruct a user to measure a height of an activated luminaire and measure distances from a corner of a room along or parallel to walls of a room to the location of the luminaire, and the measurements for a luminaire may be entered as Cartesian coordinates. Alternatively, a user may be instructed to measure direct (or shortest) distances from multiple reference points to the activated luminaire, e.g., from three corners of a room, a piece of furniture, or the cabinet of a light player. Given known locations of the tree reference points, the three direct distance measurements allow calculation of coordinates for a luminaire, e.g., Cartesian or spherical coordinates (x,y,z) or (R,θ,φ), using conventional triangulation techniques. Yet another measurement technique may employ time-of-flight cameras or sensors such as RADAR and LADAR to measure the positions of luminaires.

Figure 5C:
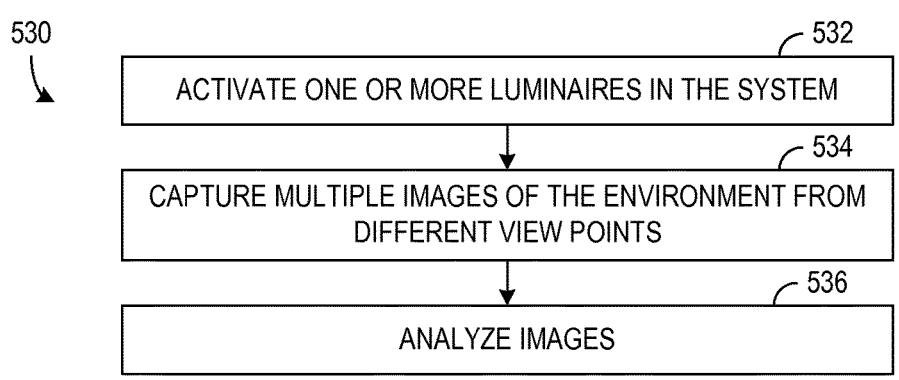

FIG. 5C is flow diagram of a process 530 for characterizing the light sources in an illumination system through image processing. In process 530, a light player executing process a process block 532 may visibly activate one or more luminaires of the illumination system. For example, the activation of a luminaire may cause the luminaire to produce distinctive illumination, e.g., light that differs in color from the light emitted by other luminaires or light that blinks or otherwise changes over time in a manner that distinguishes light from the luminaire from light from other luminaires or other light sources. Execution of process block 534 then captures images of the environment from multiple view points. For example, a user may take multiple images or still pictures from respective viewpoints facing each wall or corner of a room, the ceiling of a room, or any other vantage that captures images of multiple luminaires. Alternatively, a user could move around the environment while taking a video of the lights, walls, floors, or other features of the environment. Image capture process 534 could, for example, be performed using a smart phone with an app that uses sensors, e.g., GPS, accelerometer, magnetic or tilt sensors, to measure the position or orientation from which the images are captured. In yet another implementation of image capture process 534, the light player or the luminaires in the environment may include cameras, e.g., environment sensors 170 or 350 in luminaire 100 or light player 300, capable of capturing images of the environment from multiple view points or vantages. For example, each luminaire may blink a coded light message identifying the luminaire, while cameras or other direction sensitive light sensors in the other luminaires captures images or video so that a direction from each of the other luminaires to the blinking luminaire can be determined.

A process 536 analyzes the images, identifies the luminaires in the images, and determines coordinates of the luminaires based on the locations of the luminaires in the images and information regarding the respective view points of images. In particular, an image analysis program may distinguish luminaires in images or video based on the distinctive light emissions of the luminaires or alternatively based distinct shapes or markings of the luminaires. Further, a light player or other device analyzing the images may have information regarding the shape and size, e.g., the length, width, and height of each luminaire or the area of light emission from each luminaire, from the luminaire's specifications and may use such information to provide a distance scale to the images. Accordingly, process block 636 may employ triangulation or other geometric analysis to determine the coordinates of each luminaire based on the locations of the luminaire in multiple images taken from different viewpoints.

Figure 5D:
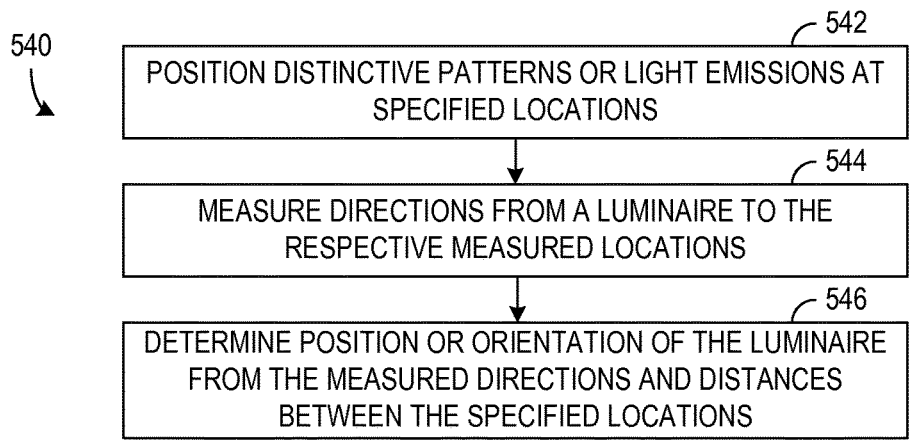

FIG. 5D is a flow diagram of a process 540 for characterizing the position or orientation of luminaires using sensors in the luminaires and distinctive patterns or light emissions at measured positions in the environment. For example, a process block 542 may operate one or more light sources to produce distinctive light emissions that originate from multiple measured locations, while process block 544 operates light sensors in the luminaires to detect the emissions and measure respective directions to the distinctive light emissions. In one implementation, the light emissions are from two or more sources fixed at measured locations, e.g., on the casing of a light player or a luminaire. In another implementation, the source of the light emissions moves to a series of locations, e.g., one light source may move vertically, then horizontally in an east-west direction, and then horizontally in a north-south direction. Yet another implementation uses distinctive patterns, e.g., shapes, at measured locations, and each luminaire may detect the location of the distinctive patterns using a camera and shape recognition processes. Conventional geometric or triangulation techniques given the known distances between three measured locations can use the respective three direction measurements by a luminaire to determine the coordinates and the orientation of the luminaire.

Figure 5E:
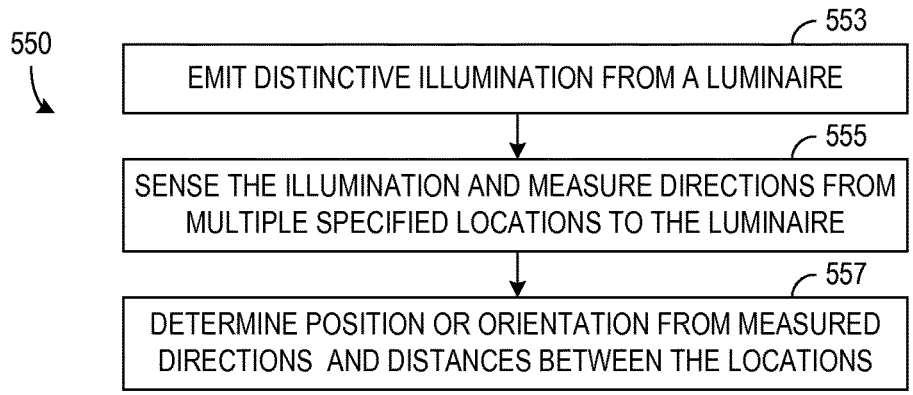

FIG. 5E is flow diagram of a process 550 that uses sensor measurement at measured locations, rather than light emissions at measured locations, to determine the positions or orientations of luminaires in an illumination system. The sensor measurements may be taken by a system including multiple fixed sensors, e.g., three or more sensors mounted on the casing of a light player or a luminaire, or by moving a sensor to the measured locations. The sensors may be of different types. Different weighting factors for sensors may be used if sensitivity or accuracy differs for different sensors or if one measurement is more important than others to accurate determination of locations. In one process, after a background scan of the sensors with all luminaires off, each luminaire, one at a time, or in groups may be activated with coded blinking and mapped by one or more light sensors in the environment. Conventional geometric or triangulation techniques given the known distances between three sensor locations can use the respective three measured directions to a luminaire to determine the coordinates and the orientation of the luminaire.

Figure 5F:
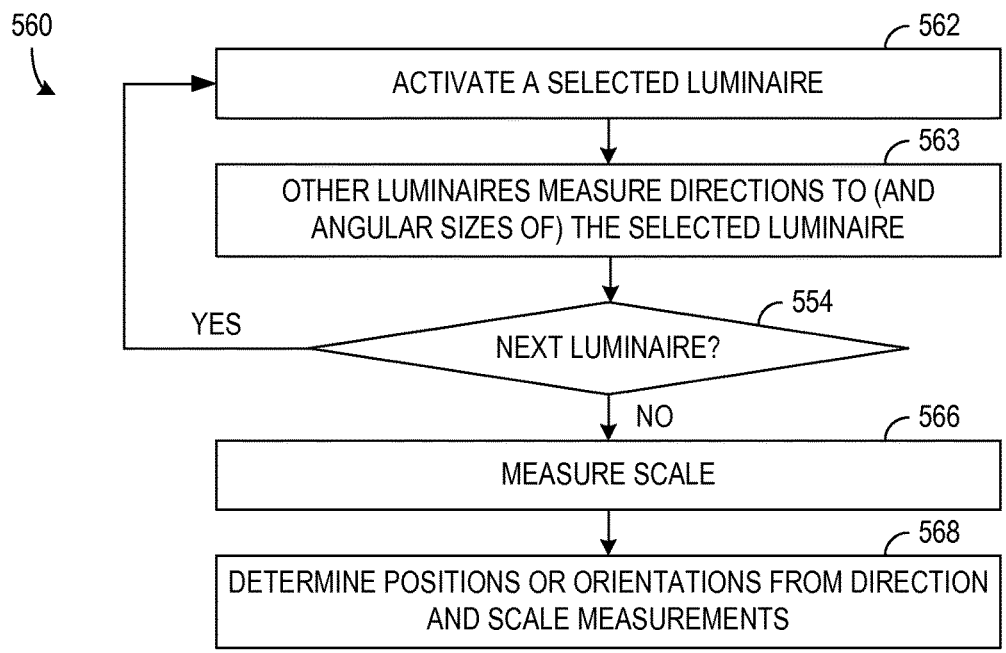

FIG. 5F is a flow diagram of a process 560 that employs light or communication signal emissions from the luminaires in an illumination system and direction sensing in the luminaires when mapping the locations and orientations of the luminaires. Process 560 begins with a process 562 of activating a selected one of the luminaires of the illumination system. The selected luminaire may be activated to emit light or a communication signal, e.g., an RF or IR signal, that allows one, some, or all of the other luminaires in the illumination system to measure a direction or distance to the selected luminaire. Process block 563 illustrates measurements by the other luminaire or luminaires. For example, each luminaire may include a camera or other light direction sensor that can distinguish light emitted from the selected luminaire and measure a direction to or an angular size of the selected luminaire. In light systems that communicate wirelessly, the communication signals from the luminaires along with signals from a communication wireless hub (Wi-Fi, zigbee, bluetooth, cell, etc) may be used to determine the directions to or distances between luminaires.

A decision block 554 may determine whether to select a next one of the luminaires in the light system and repeat the activation and direction measurement processes 562 and 563. In general, if block 563 measures directions to the selected luminaire from all other luminaires, repeating activation and measurement processes 562 and 563 will provide redundant measurements, which may be unnecessary or may be desirable to improve the accuracy of the mapping of the luminaires. An alternative to sequential selection of luminaires instead selects and activates multiple luminaires simultaneously, but distinguishing among multiple luminaires may make measurements in process block 563 more difficult. Sequential or parallel repetitions of process blocks 562 and 563 can end when a sufficient set of direction measurements have been acquired.

Scale or distance measurements may be needed in addition to direction measurements for calculations that determine the coordinates of the luminaires for mapping of the illumination system. In one implementation, one or more of the luminaires in the illumination system may have light emitting areas that are known from the luminaires' specifications, and a luminaire in the illumination system performing process block 563 may measure an angular size of the selected luminaire. The angular size is related to the orientations of the luminaires and the distance between the selected luminaire and the measuring luminaire. The angular sizes determined by one or more luminaires can thus give a scale measurements, so that a process 568 can use geometric formula to determine coordinates and orientations of the luminaires in the illumination system. Alternatively, a process block 566 may otherwise measure a distance between two of the luminaires using any measurement technique to provide a distance scale for the geometric calculations that map the luminaires locations.

In addition to acquiring characterizing information for the luminaires in the illumination system, characterizing process 510 may include a process block 516 for characterizing the environment that the illumination system illuminates. For example, light sensors in the luminaires or associated with a light player may measure light from uncontrolled light sources or may allow measurement how reflections in the environment behave in response to spectrally tunable emissions from the luminaires. An outdoor spectrometer and cosine corrector monitoring daylight may measure outdoor lighting to indirectly measure light entering an indoor environment through a window, skylight, or other structure. A sensor such as a spectrometer inside a window may similarly measure and record entering daylight from dawn to dusk.

The acquired characterizing information for an environment may apply to the environment globally or to specific areas in the environment. Examples of global characterizing information include the local time at the environment, the latitude and longitude of the environment, and an indicator of compass directions. A light player might use global characterizing information to synchronize illumination according to the local time or position of outside light sources such as the sun or moon or to compensate for environmental factors. Examples of characterizing information for limited areas of an environment might include the properties and locations of objects such as windows, uncontrolled light fixtures, and reflective surfaces in an environment. More specifically, the environment may include reflective surfaces such as walls or objects with a size, color, or reflective characteristics that alter the overall illumination in an environment. Similarly, light sources that a light player is unable to control may contribute to the illumination in an environment. A light player may ignore such uncontrolled light sources or reflections when playing illumination, or based on characterizing information for the environment or real-time light measurements, a light player may edit or modify the light from the luminaires of the illumination system to actively compensate for the uncontrolled light sources or reflections. For example, adapter 334 may modify illumination content played by the luminaires in the illumination system to compensate for the light from uncontrolled light sources or reflections.

A light player may be programmed to control or facilitate processes for measuring characteristics of the illuminated environment. For example, a light player may operate a luminaire to emit illumination, while a camera or other light sensor measures light in the environment. The camera can thus detect reflected light in the environment for characterization of the reflective character of the illuminated environment. Such measurements may also determine characteristics of the luminaires. For example, moving a light sensor along an approximately constant radius from an activated luminaire may measure the dispersion or angular distribution of light emitted from the luminaire. Any means for moving the camera/sensor may be employed, including a user walking a camera around the luminaire, hanging a camera on a pendulum anchored to the luminaire, attaching a camera to a drone and flying the drone under human or AI control. The change in measured intensity indicates angular dispersion of the luminaire.

The location of an illuminated environment may also provide useful information for operation of an illumination system. For example, the longitude, latitude, and orientation of the illuminated environment can be used to calculate the sun's path over the illuminated environment throughout the year to harmonize the illumination goals of an illumination system with the particular locale of the illumination system. In addition to calculations that can be made of the sun's path and output over the course of a day, a spectrometer(s) could be deployed to collect real time illumination data to be replayed indoors where daylight does not penetrate adequately or replayed at a later time such as for the night shift workers. Replay of sunlight, either at the actual time scale or at a compressed or extended timescale may be useful during winter or for a jetlag remedy.

Figure 6A:
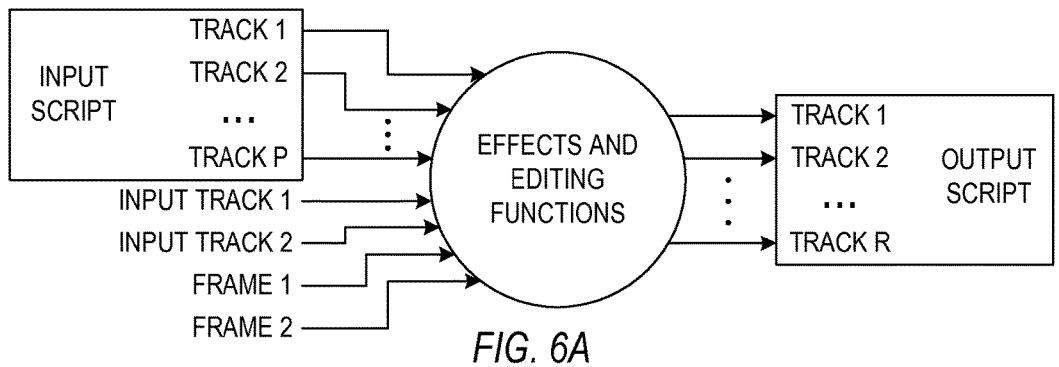
FIG. 6A is a block diagram illustrating illumination content editing.

In accordance with a further aspect disclosed herein, illumination content can be modified or created using an illumination content editing system. An adapter associated with a light player, for example, may perform editing operation to modify illumination content according to user preferences, the location or characteristics of an illumination system, or measurements of uncontrolled or ambient illumination. In another application, a user may employ an editing system to produce illumination content corresponding to illumination for playback on illumination systems. In particular, FIG. 6A illustrates an editing system that may build an output lumenscript from a collection of data that may include static illumination frames (e.g., representations of spectral power distributions) or illumination clips (e.g., multiple frames, each having a specific duration and time order). The editing system particularly may apply editing effects and operations on the input scripts, tracks, or frames to produce one or more output tracks encoded in the output script.

Figure 6B:
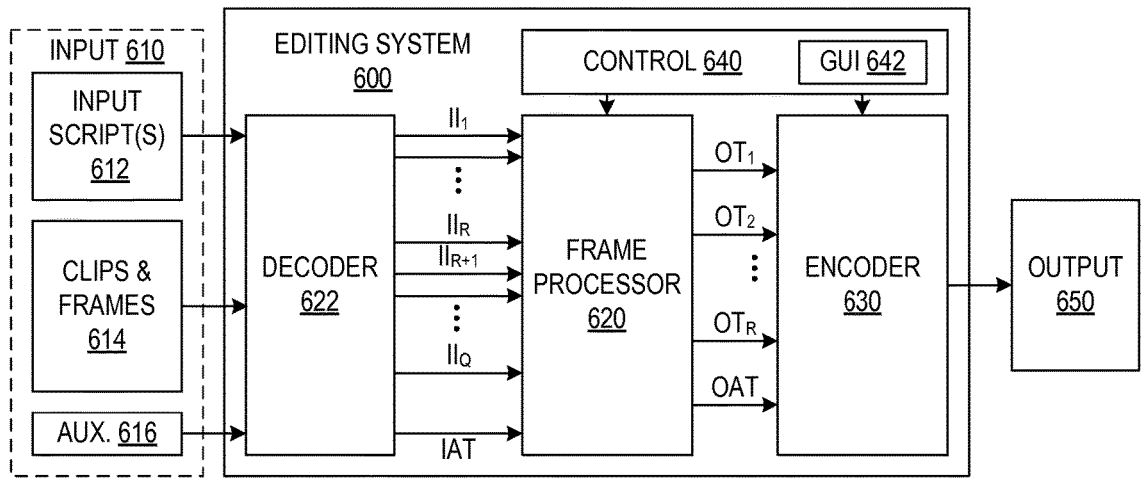
FIG. 6B is a block diagram illustrating functional modules in one implementation of an illumination content editing system.

FIG. 6B shows the major functional modules of one implementation of an illumination editing system 600. Editing system 600 may be used in a light player to modify illumination according to user preferences or according to variable conditions an illuminated environment or may be used by an human user, developer, or editor to author, create, or modify illumination content. A control module 640 for editing system 600 may thus be adapted to perform automated editing operations based on user preferences or sensor input in a light player or adapted to receive and interpret user command when employed in an editing environment. In the illustrated embodiment, control module 640 implements a GUI 642 that may provide information to a user and may allow the user to control editing operations that editing system 600 performs. Editing system 600, as illustrated, operates on input information 610 to produce output illumination content 650 for a target illumination system. Output illumination content 650 may include a script with one or more output tracks $OT_1$ to $OT_R$ representing respective illumination to be played on R luminaires in the target illumination system. Input information 610 may include one or more illumination scripts 612, one or more illumination tracks or frames 614, and auxiliary information 616. In one application of editing system 600, an editor uses editing system 600 to modify an illumination script 612 or combine multiple illumination scripts 612. Alternatively, an editor may construct illumination content 650 using clips and frames selected from a library of illumination data. In yet another alternative, an editor may use editing system 600 to create illumination content 650 from scratch. In particular, a user operating editing system 600 may start with illumination content representing a default illumination, e.g., dark illumination, and may construct the desired spatial, distributional, and temporal characteristics of the illumination represented in output illumination content 650.

Scripts, clips, and frames in input information 610 may employ many different formats or data structures to represent static or evolving illumination. In particular, input information 610 that represents illumination content as a frame or a series of frame may employ different frame formats. A "sampled" frame, for example, may represent a spectral power distribution using a set of values that the spectral power distribution has at specific wavelengths. A "compiled" frame may represent a spectral power distribution using a vector of drive levels required for a model or specified luminaire with known channel emission spectra to emit the spectral power distribution. A "palette-encoded" frame may represent a spectral power distribution using a vector of photometric quantities for illumination reflected off or transmitted through a reference palette of objects having known reflectance or transmittance spectra. A decoder 622 in editing system 600 may convert input illumination information 612 and 614 to illumination tracks or information $II_1$ to $II_Q$ that all employ the same or standardized representation for spectral power distributions. In an exemplary embodiment, illumination information $II_1$ to $II_Q$ represent Q distinct illumination frames or sequences of illumination frames, and each illumination frame is a sampled illumination frame. Each frame may have a sequence order or time index and a duration indicating the timing for emission of described by the frame.

Input scripts 612 (if included in input information 610) may be formatted for the target system, e.g., may be translated as described above for use in the target system, so that decoding of a script 612 may produce illumination tracks $II_1$ to $II_R$ that correspond one-to-one with output tracks $OT_1$ to $OT_R$ and therefore are associated specified luminaire characteristics such as location and orientation. More generally, each input track or information stream $II_1$ to $II_Q$ may or may not be associated with a particular luminaire in the target system and may not be associated with any luminaire position or orientation.

In the illustrated embodiment, editing system 600 includes a frame processor 620 capable of operating on illumination frames by applying editing effects or operations that manipulate input information $II_1$ to $II_Q$ to produce illumination frames in output illumination tracks $OT_1$ to $OT_R$. Frame processor 620 is, however, not limited to manipulating illumination information $II_1$ to $II_Q$ to produce output illumination tracks $OT_1$ to $OT_R$ but may manipulate input auxiliary information IAT and may produce one or more output auxiliary tracks OAT. Any input auxiliary information IAT (if used) may represent types of presentations other than illumination, e.g., audio, still images, or video, that may be associated with or accompany illumination. FIG. 6B shows decoder 622 in the data path of input auxiliary information IAT, but auxiliary information IAT may include auxiliary information that is that is identical to auxiliary information 616 or may be include included auxiliary information that is decoded from other sources, e.g., from input scripts 612. Editing system 600 may edit the auxiliary information IAT using techniques that are known or appropriate for the type of auxiliary information IAT. For example, editing system 600 may edit audio using techniques known for audio editing or may edit images or video using techniques known for image or video editing. Editing system 600 may further perform mixed media editing that manipulates both illumination and auxiliary content. For example, a relatively simple mixed-media editing operation may synchronize illumination tracks $OT_1$ to $OT_R$ with auxiliary tracks OAT. In particular, time codes or indices such as used in audio and video may be used with illumination editing. Frame processor 620 may also alter output illumination content, e.g., alter tracks $OT_1$ to $OT_R$, based on the content of auxiliary tracks IAT or OAT or alter output auxiliary tracks OAT based on illumination content, e.g., based on illumination tracks $II_1$ to $II_Q$ or $OT_1$ to $OT_R$. For example, a characteristic of an auxiliary track such as the volume or frequency of audio represented in the input auxiliary track IAT may be altered according to a characteristic such as the intensity or color of illumination, or similarly, the characteristics of an illumination track may be altered according to the characteristics of an auxiliary track. It may be noted that while images, video, or audio may currently be the most common editable types of presentation content, input auxiliary tracks IAT may represent many other types of presentations including but not limited to presentations of smells, touch (vibration/movement), HVAC (temperature/humidity), IR (heating), window blind operations, control of variable transmission windows, and command (external I/O synchronization) operations.

Illumination editing operations that frame processor 620 may implement may include functions and effects that are applicable to signal editing generally and also functions and effects that are specific to illumination. The editing functions may operate on output tracks $OT_1$ to $OT_R$ and OAT or on information being combined with output tracks $OT_1$ to $OT_R$ and OAT. For example, frame processor 620 may scale a frame, e.g., increase or decrease in intensity of the spectral power distribution represented by the frame, in an output track $OT_i$ or may scale a frame from one of input information $II_1$ to $II_Q$ before combining the scaled frame into an output track $OT_i$ or intermediate illumination content that may be used in a subsequent editing operation. The following describes some illumination editing functions of frame processor 620 that may be applied to produce a single output track $OT_i$. It may be understood, that producing multi-track illumination content can be accomplished by parallel or sequential generation of the output tracks.

A starting point for frame processor 620 when producing an output track $OT_i$ may be: a blank track, e.g., an illumination track that is dark over its entire duration; an input illumination track, particularly a track $IT_i$ from scripts 612 when a script 612 is being edited, a clip or frame 614 from an illumination library, or a spatial interpolation of multiple input illumination tracks $II_1$ to $II_Q$ such as described above for translation of illumination content. Frame processor 620 may then perform editing operations to alter the information in the output track $OT_i$ or alter other illumination information for combination with or use in the output track $OT_i$. Some examples of editing operation follow.

Splicing operations can change the sequence of frames in a track. For example, a "delete" operation can take a current version of a track and delete a frame or a clip from the current version of the track and then adjust the time indices of the remaining frames in that track. An "insert" operation can take a current version of a track and insert a user-selected frame or clip of frames at a user selected time index and shift the time indices of later frames in that track. A "replace" operation can take the current version of a track and replace a frame or a clip of frames beginning at a user selected time index in the current version with a user-selected frame or a clip of frames from an another source, e.g., from another track. When splicing, transitions from one clip or frame to a next may be smoothed, for example, by a linear or any interpolation of luminous output between the last frame or frames of one clip and the first frame or frames of a next clip. The smoothing may, for example, include interpolation of the color point or color temperature of the illumination. In particular, the interpolation between two frames with different color temperatures may follow the black body curve, a daylight curve, a linear interpolation, or a user-defined curve.

Timing transformation operations can modify the timing of frames in clip or a track and may commonly be applied in the same manner to all tracks. In particular, timing transformations of a single track may slow down, speed up, reverse a clip of frames. For example, a "slow down" operation may systematically insert copies or duplicates of frames into a track or may extend durations respectively associated with the frames, and a "speed up" operation may systematically delete frames or decrease durations respectively associated with the frames. A "reverse" operation can systematically swap frames from the end of a user-selected clip with frames from the beginning of the user-selected clip. A "duration" operation can set the duration of a frame or a clip. Extending or slowing down a clip may particularly be accomplished by increasing the duration of frames in the clip or by insert frames with or without smoothing transitions between frames in the clip.

"Intensity" editing operations may change luminous output of a frame or a clip in a track. An intensity for a frame may be altered, for example, by multiplying sampled values of the spectral power distribution of the frame by a factor that would be less than one for dimming and greater than one for brightening. Scaling luminous flux of illumination content may be employed for ascetic reasons but in some cases may be needed to adapt the illumination content to a particular type of luminaire. For example, illumination content may have too wide a dynamic range for playing on a target luminaire. The editing system or adapter, particularly one in a light player such as illustrated in FIG. 3A, may change the dynamic range of the luminous output to adapt the illumination content to the available dynamic range of the target luminaire. As another example, an editing system may scale the luminous output down so that a particular luminaire stays within a recommended temperature range for the luminaire.

Spectral transformation operations can modify the spectral power distribution associated with a frame. "Subtractive synthesis" is an example of an editing operation that may be specific to the editing of illumination. A subtractive synthesis operation can modify a frame or each frame of a clip by multiplying the spectral power distribution of the frame by a color filter transmission spectrum. In particular, each sampled value of the spectral power distribution may be multiplied by a value of the transmission spectrum associated with the wavelength that is also associated with the sampled value. (Subtract synthesis may be considered specific cases of multiplication of spectral power distributions by frequency-varying envelopes.) Various transmission spectra may be created based on real physical light filters or virtual light filters and may be stored for a user to select and use in filter operations. Subtractive synthesis may be particularly convenient for theatrical lighting designers that may be accustomed to selecting a lamp and one or more filters to achieve the desired lighting effect. Spectral transformation may further include time variations so that a filtered transmission spectrum varies with time. For example, a filter effect may modify a clip of a day of sunlight to appear to be filtered by a layer of moving or rippling water.

Spectral transformation operations may also adjust the color point of a frame or the frames in a clip. One possible implementation of color point adjustment could modify the color point a spectral power distribution under a constraint that the shape of the spectral power distribution remains as close as possible to the unmodified spectral power distribution.

An editing system, particularly one in a light player, may also use spectral transformations to implement user preferences. For example, a luminaire may have a "high fidelity mode" which would use all available spectral channels to approximate a spectral power distribution as closely as possible and may further have a "high efficiency mode" that avoids using one or more spectral channels that have lower lumens per watt ratings. A user may select one of the available modes of the luminaire, and an adapter may modify illumination content for use in the user-selected mode.

Many of the above types of editing operations may be combined. For example, a dim/brighten operation in addition to changing intensity of illumination can alter a spectral power distribution with a spectral transformation that depends on the level of dimming or brightening. In particular, the color of the illumination may warm or cool as the illumination brightens or dims. A spectral transformation more generally could apply any time-varying or frequency-varying envelope to a frame or clip. A static or dynamic frequency-varying envelope can be applied to each frame in a clip as described above by multiplying sampled values of a spectral power distribution by a wavelength-varying factor. Applying a time-varying envelope may similarly multiply samples representing a frame or clip by a time-varying envelope. Such envelopes may be created in a variety of ways including deriving the envelope based on a clip from another track. For example, to produce illumination corresponding to moon light reflected from rippling water, the spectral power distribution of direct moonlight may be recorded separately from reflections of a high-intensity light from rippling water, and editing system 600 may apply an envelope derived from the water recording to the moonlight recording.

A "mixdown" operation may create a track, a clip, or a frame as a linear combination of corresponding information from other tracks, clips, or frames. Spatial interpolation, as described above, may be considered as a specific type of mixdown operation. Another example of a mixdown operation may combine spectrums representing different types of lighting to achieve combined or superimposed illumination. For example, a mixdown operation may combine a spectrum of sunlight with spectrum of the blue sky in various degrees to imitate a passing cloud. Alternatively, a mixdown operation in a light player may subtract the spectral content of uncontrolled light emissions in an illuminated environment from the light emissions that the light system produces, so that the combination of the uncontrolled light emissions and the light emissions from the illumination system more closely approximates the desired illumination.

Frame processor 620 can further apply any "math" operations, e.g., addition, subtraction, multiplication, and division, and functions, e.g., 1/x, x^2, to any number of variables, where the variables may be individual sample values in the raw representation of a spectral power distribution, time, intensity, or any general data. One example application of math operations would be temporal interpolation or morphing between frames according to a specified rule or mathematical function. For example, a user may choose to interpolate between the last frame of a first clip and the first frame of a second clip that begins after the first clip to create a smooth transition between the clips.

"Metadata" operations may allow a user to add metadata to illumination content. For example, a user may be able to add timestamp to illumination content or a particular a clip to schedule playback of the illumination content or clip for a particular time of day. Metadata could also indicate other conditions during which particular illumination is played, e.g., in response to an occupancy sensor or a temperature sensor. The metadata may also instruct a light player to scale the dynamic range of the intensity for playback in a specific way.

Illumination editing operations, such as described above, which may be applied to the content of a single illumination track, may also be applied to multiple illumination tracks. Frame processor 620 may allow a user to group multiple tracks or luminaires and impose like characteristics or operations on the grouped tracks or luminaires. For example, a user of frame processor 620 may select a set of tracks to be in the same group and then apply the same editing operation to all tracks in the user-defined group. A track or luminaire can be in more than one group at a time. The groups and associated actions might be called scenes elsewhere in lighting design.

Figure 7:
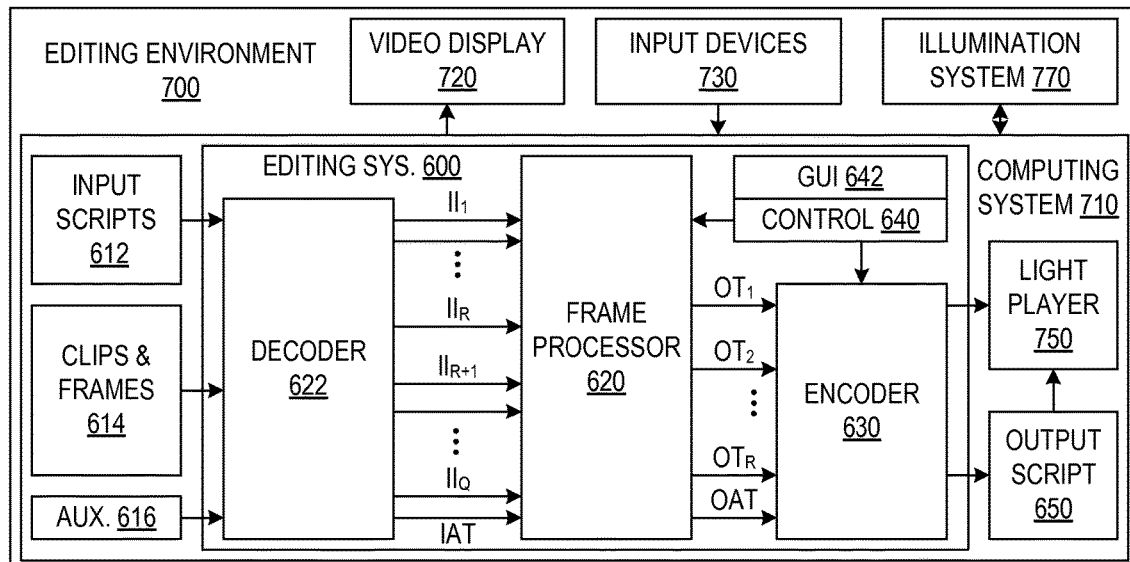
FIG. 7 is a block diagram illustrating functional modules in one implementation of an illumination content editing environment.

FIG. 7 illustrates one implementation of an illumination content editing environment 700. Editing environment 700 includes a computing system such as desktop computer, a laptop computer, a tablet computer, a smart phone, or any other computing hardware in which editing system 600 may be implemented. In alternative implementations, editing system 600 may include a desktop application, a mobile app, or a web-based application running on a server and accessible through a browser-based interface. In the implementation of FIG. 7, a user editing an input lumenscript 612 or otherwise creating a new lumenscript 650 can interact with a command interface or GUI 642 in control module 640 using conventional input/output devices connected to computing system 710 and/or using devices specialized for illumination content editing. Editing environment 700 particularly includes a video display 720 that may present a portion of GUI 642 and user input devices 730 that allow the user to interact with control module 640. (Input devices 730 may, for example, be conventional devices such as a keyboard, a mouse or other pointing device, or a touch screen.) Editing environment 700 also includes a light player 750, which may be implemented in computing system 710 or in separate hardware (not shown). Light player 750 controls operation of an illumination system 770 for editing environment 700 and may allow a user to experience the actual illumination resulting from editing operations. Video display 720 may display a graphical representation of the characteristics of the illumination or an image or sound clues to lighting at the same time illumination system 770 plays the illumination or instead having light system 770 play the illumination being edited.

Figure 8A:
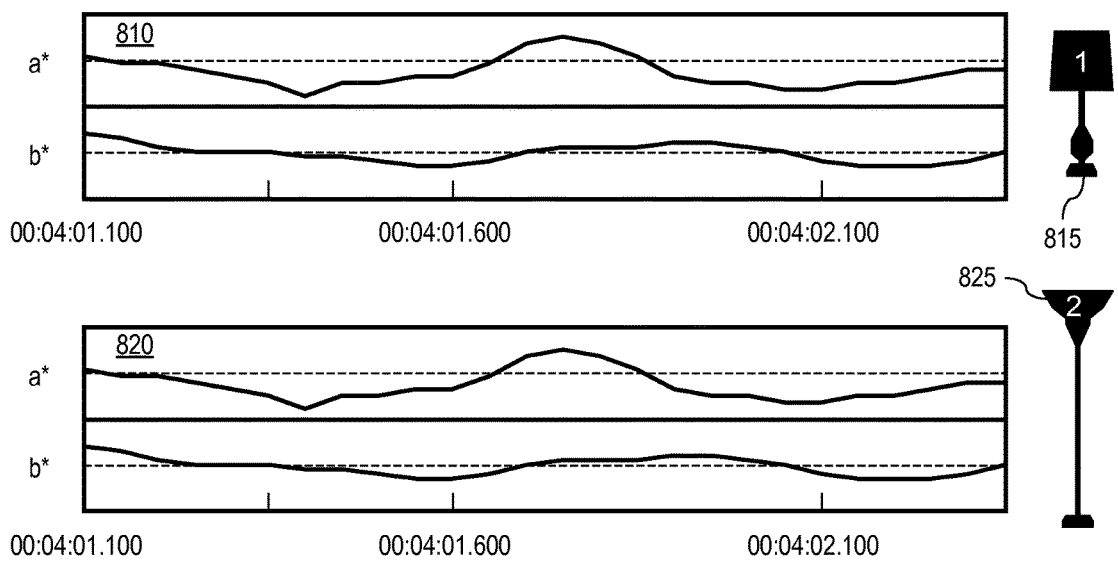
FIGS. 8A and 8B illustrate portions of a graphic user interface that one implementation of an illumination content editing system may provide to represent illumination content.
Figure 8B:
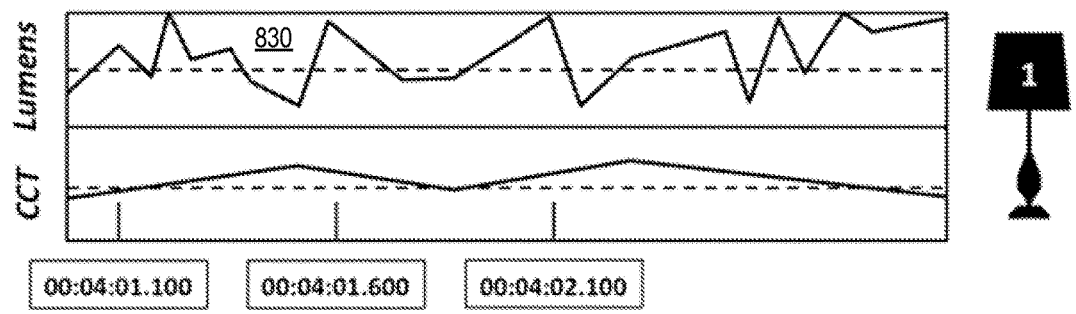

FIG. 8A particularly illustrates charts 810 and 820 that editing system 600 may present to a user as part of the user interface used during editing of illumination content. Each chart 810 or 820 corresponds to an illumination track for a luminaire 815 or 825 in the target illumination system. Each chart shows 810 or 820 shows as a function of time one or more photometric quantity, e.g., luminous flux, illumination power, radiance, luminance, chroma, a function of a tristimulus value, a coordinate in color space, a function of a coordinate in color space, or correlated color temperature (CCT) of illumination represented by the frames of the illumination content, derived from a current version of a corresponding track. For example, FIG. 8A shows graphs of CIE L*a*b* chromas calculated for the two tracks describing illumination from luminaires 815 and 825. FIG. 8B shows a chart 830 that illustrates content from an illumination track as graphs of the luminous output and the correlated color temperature of illumination as a function of time.

Figure 9A:
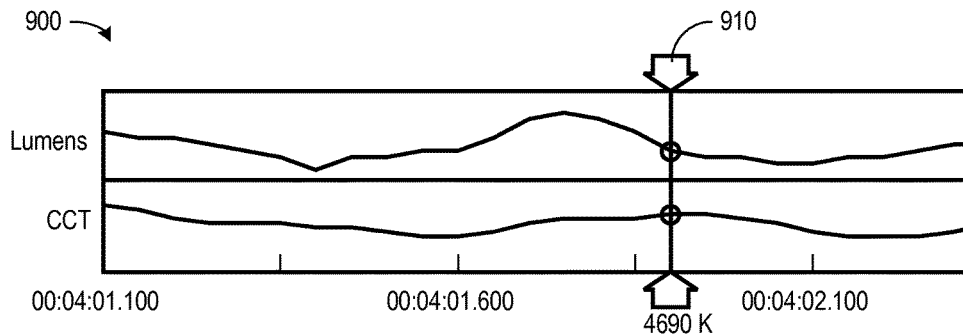
FIG. 9A illustrates a portion of a graphic user interface that one implementation of an illumination content editing system may allow a user to select or alter one or more frame of illumination content.
Figure 9A:
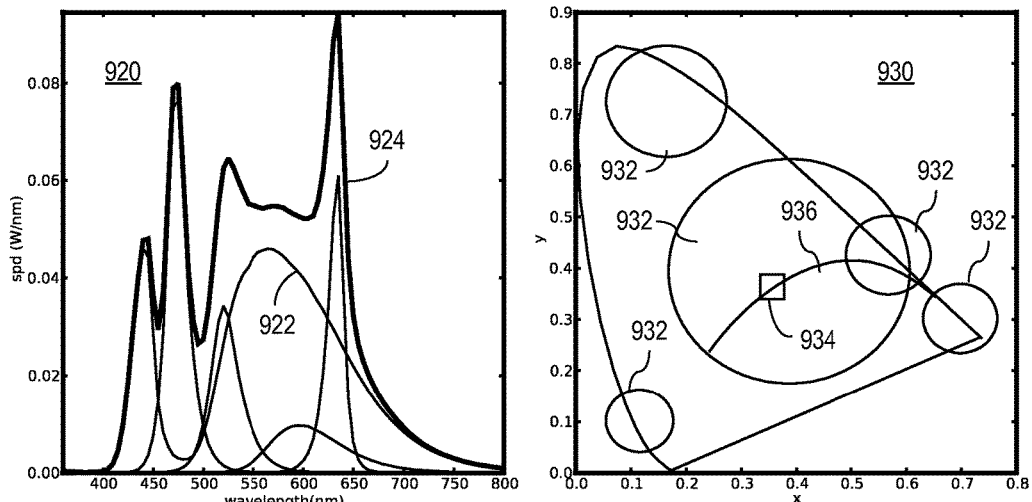

Charts 810, 820, and 830 in a graphic user interface may allows a user to select a frame or a clip of frames from either track by moving a cursor to selected a desired time index or a desired range of the time index on a chart 810, 820, or 830 to be presented with a frame view representative of a first of the frames selected. FIG. 9A shows an example of a frame view 900 on a video display when a user selected a frame corresponding to a time index 910 in one track. In this example, frame view 900 illustrates the characteristics of the selected frame by displaying a spectral power distribution plot 920 and a CIE x,y plot 930 that are associated with the selected frame. Frame characteristics may be alternatively present in many different ways. For example, as an alternative to spectral power distribution, a control module may present coordinates of a standard palette of color samples under illumination is a suitable color space.

Spectral power distribution plot 920 showing a spectral power distribution 924 emitted from the target luminaire when playing the selected frame. Spectral power distribution 924 may be specific to the luminaire (or the type of luminaire) associated with the selected track and is the sum of spectral power distributions 922 emitted by the spectral channels of the luminaire when playing the selected frame. The shape of the spectral power distributions 922 for the spectral channels of the luminaire or that type of luminaire may be given by the luminaire data or the specifications of the luminaire or that type of luminaire. In particular, luminaire data, e.g., device data 166 for luminaire 100 of FIG. 1, may include one or more tables for each spectral channel where each entry in the table for a spectral channel corresponds to a drive level applied to the spectral channel and represents the spectral power distribution that the spectral channel produces in response to the drive level. The magnitudes or maximum heights of the spectral power distributions 922 of the channels depend on and are illustrated according to the power levels applied to the respective spectral channels while playing the selected frame. Editing system 600 can calculate spectral power distributions 922 and 924 from the information in luminaire specifications and a frame descriptor for the selected frame.

Figure 9B:
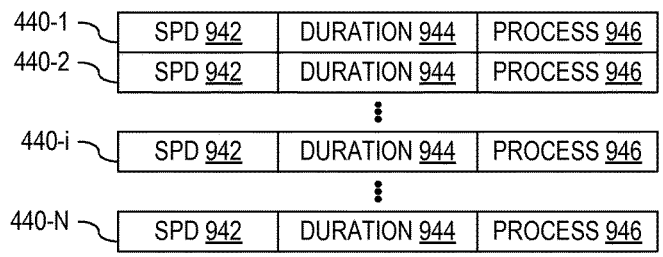
FIG. 9B illustrates a format for a sequence frame descriptors representing a track or clip of illumination content.

FIG. 9B shows an example format for a sequence of frame descriptors 440-1 to 440-N, sometimes generically referred to herein as frames 440, that may represent an illumination track or clip. In the illustrated implementation, each frame descriptor 440 includes a SPD field 942 containing a representation of a spectral power distribution 942, a duration field 944 representing a duration for the frame, and a process field 946 indicating a process or subroutine that may be executed during the duration of the frame. SPD field 942 may represent a spectral power distribution using different formats. For example, SPD field 942 may represent a spectral power distribution using a set of sampled values taken from the spectral power distribution at a set of different wavelengths. A frame 440 that represents a spectral power distribution using sampled values of the spectral power distribution is sometimes referred to herein as a "raw" or "sampled" frame. Alternatively, SPD field 942 may represent a spectral power distribution using the drive levels that when applied to the spectral channels of a specific luminaire produce the represented spectral power distribution, and a frame containing drive levels is sometimes referred to herein as a "compiled" frame. For yet another alternative sometimes referred to herein as a "palette-encoded" frame, the spectral power distribution may be represented using a vector of intensities of desired light reflected by a standardized set or palette of color samples or using a vector formed by color points of desired light reflected by the standardized set of color samples as described in US Pat. App. Pub. No. 2015/0123564, entitled "Synthesizing Lighting to Control Apparent Colors," which is hereby incorporated by reference in its entirety. With a compiled frame, an editing system can construct plot 920 by displaying spectral power distributions 922 that luminaire data provides for the drive levels indicated in the compiled frame and can sum spectral power distributions 922 for display of total spectral power distribution 924. With a raw frame, which indicates a desired total power distribution 924, an editing system can perform an optimization calculation can determine drive levels for the component spectral channels that will minimize a measure of the difference between the sampled spectral power distribution and the sum of the component spectral power distributions.

CIE x,y plot 930 of FIG. 9A shows a color space graph including a set of circles 932, each of which is centered on the color of a corresponding one of the spectral channels of the luminaire. The size, e.g., the radius or area, of each circle 932 may indicate the drive level for the spectral channel corresponding to the circle 932 or an intensity of light emitted from the spectral channel corresponding to the circle 932. An editing system can determine the displayed sizes of circles 932 from the drive levels identified using the frame descriptor or luminaire data as described in the preceding paragraph. A box 934 on black body radiation curve 936 identifies a color temperature or chromaticity for the total illumination from the luminaire when playing the selected frame. The editing system may use known photometric formulas to determine color temperature and chromaticity from the total spectral power distribution 924.

Editing system 600 can employ plots 920 and 930 in a graphic user interface to allow the user to modify a frame in several different ways. For example, a user can "grab" a point on spectral power distribution plot 924 and drag the point up or down to indicate a desired change the luminous output for the selected frame. In response to the change in shape of the total spectral power distribution 924, editing system 600 can calculate the required changes in the component spectral power distributions 922 and the corresponding changes in drive levels needed to effect the change in the spectral power distribution 924. In particular, an optimization calculation can determine values of the respective drive levels for the component spectral channels required to minimize a measure of the difference between the produced total spectral power distribution and the desired spectral power distribution.

A user can similarly select a point on a component spectral power distribution plot 922 and drag the selected point to indicate a desired change in the luminous output from the corresponding spectral channel during the selected frame. Editing system 600 can calculate the corresponding change in the drive level for the selected spectral channel through use of luminaire data, particularly a table indicating the spectral power distributions respectively produced when different drive levels are applied to the selected spectral channel. The new spectral power distribution 922 from the selected channel can then be displayed and added to the spectral power distributions of the other spectral channels to calculate the new total spectral power distribution 924. A user may similarly grab the color point square 934 in plot 930 and move the color point in the x,y space to adjust the chromaticity of the light emitted from the luminaire at the selected time, or a user can change the size of a selected circle 932 to change the drive level and the emitted intensity for the corresponding spectral channel. In general, the color point does not uniquely define the drive levels of a luminaire with more than three spectral channels, so editing system 600 may shift the color point by modifying the spectrum while keeping its shape as close as possible to the original spectrum. With yet another technique, a user may click on a circle 932 representing a contribution to the output light by a particular channel, and editing system 600 may modify the drive level of the selected channel in order to turn it off, or maximize, or fix that drive level at a certain value, or tie that drive level to the drive level of another channel, and calculate a new drive level vector in order to compensate for the user action with the goal of, for example, keeping the luminous output, color point, and color rendering as close as possible to those of the original frame.

Figure 9C:
FIG. 9C illustrates a portion of a graphic user interface that one implementation of an illumination content editing system may provide to allow a user to apply an editing operation at a selected time index or to a selected frame or clip.

Selection of a frame or frames 910 as shown in FIG. 9A may cause a control module of an illumination editing system to activate an additional user interface component that permits a user to perform editing operations on the selected frame or frames or at a time index corresponding to the selected frame. FIG. 9C illustrates a user interface that allows a user to control an editing operation performed on or at the selected frame. The illustrated interface provides a content control 950, a scale control 952, a duration control 954, a frame repetition control 956, a frame process control 958, and an editing operation control 960.

Content control 950 in the illustrated implementation is a pull down menu that allows a user to select illumination content from among available frames or clips, e.g., from a library of frames or spectral power distributions. FIG. 9C shows examples representing the current selected frame, light from a volcano, sunlight at sunrise, or sunlight in an underwater environment as a few from a myriad of possible spectral power distributions or clips that may be available.

Scale control 952 allows a user to select intensity scale for the frame. For example, the scale that a user enters into scale control 952 may be less than one for dimming, one for no dimming, or greater than one for brightening of the selected illumination content. Alternatively, a slider control could be used to control total frame intensity.

Duration control 952 allows a user to select a time during which the selected frame or frames in the selected clip will be played. For a luminaire having a specific frame rate, the time entered into duration control 954 may, for example, be converted into a number of periods at the frame rate, and the duration may be inserted into the duration field of a frame descriptor 940 having the format shown in FIG. 9B. To provide further time control, a user may chose to repeat the selected frame one or more times by entry of an integer in frame repetition control 956, and multiple copies of the frame being editing may be sequential in the illumination track or clip being edited.

Process control 958 in the illustrated embodiment that allows a user to select whether a smoothing process is performed during the duration of the frame. For example, a smoothing process may change the spectral power produced by a luminaire so that the emitted light at the beginning of the duration of the frame has the spectral power distribution represented in the SPD field 942 of the frame but evolves in some manner to have the spectral power distribution represented in the SPD field 942 of the next frame. With frame descriptors having the format shown in FIG. 9B, process control 958 may control the value set in process field 946. An alternative implementation of process control 958 may allow a user to select among multiple processes that could be perform due the duration of the frame.

Editing operation control 960 allows a user to select the editing operation that is performed on the selected frame or frames or at the selected time index or indices. FIG. 9C illustrates an example that appends, at the selected time index, a frame or frames defined by values in the other controls 950, 952, 954. 956, and 958. Alternatively, a user could select any of the illumination editing operations described above.

In the embodiment of FIG. 7, editing system 600 is integrated with illumination system 770, so that user changes may be immediately applied to illumination system 770, allowing the user of frame processor 620 to see the actual changes that illumination content editing makes. For example, user selection or changes of a frame illustrated by FIG. 9A or changes made using the editing interface of FIG. 9C, may result in the integrated illumination system 770 playing the selected frame and changes in the selected frame so that editing environment 700 is illuminated according to the edited illumination content.

Each of modules disclosed herein may include, for example, hardware devices including electronic circuitry for implementing the functionality described herein. In addition or as an alternative, each module may be partly or fully implemented by a processor executing instructions encoded on a machine-readable storage medium.

All or portions of some of the above-described systems and methods can be implemented in a computer-readable media, e.g., a non-transient media, such as an optical or magnetic disk, a memory card, or other solid state storage containing instructions that a computing device can execute to perform specific processes that are described herein. Such media may further be a server or may be contained in a server or other device connected to a network such as the Internet that provides for downloading or streaming of data and executable instructions.

Although particular implementations have been disclosed, these implementations are only examples and should not be taken as limitations. Various adaptations and combinations of features of the implementations disclosed are within the scope of the following claims.

GLOSSARY

Illumination Frame: a representation of a desired illumination spectrum.

Palette-Encoded Illumination Frame: A color vector representing a desired illumination spectrum, where the color vector is an array of values, e.g., tristimulus values, that respectively correspond samples of a palette of samples, each of the values characterizing light modified, e.g., reflected or transmitted, by the corresponding sample when the sample is illuminated by the desired illumination. A palette-encoded frame is therefore a palette-specific representation of the desired illumination spectrum.

Compiled Illumination Frame: An illumination frame that represents a desired illumination spectrum as a vector of drive levels to be applied to spectral channels. The drive levels can indicate duty cycles, DC currents, or any other values that are applied to spectral channels of a multichannel luminaire in order to produce the desired illumination. A compiled illumination frame may be specific to a particular luminaire or to all luminaires from the same group, build or model. If the differences between individual luminaires are insignificant, a compiled lumenscript may be created using average luminaire data in a set, and not individual luminaire data, and distributed to all luminaires in the set.

Uncompiled Illumination Frame: An illumination frame that is not a compiled illumination frame.

Frame Compiler: A device that generates a compiled illumination frame.

Illumination Track: a sequence of illumination frames.

Illumination Clip: a subsequence of illumination frames from an illumination track.

Illumination Script or Lumenscript: a representation of a collection of one or more illumination tracks.

Luminaire data: Data that characterizes a luminaire, for example, representing respective emission spectra of the spectral channels of a multichannel luminaire at different drive levels, temperature dependence of illumination, the useful range of drive levels, power consumption of the luminaire as a function of drive levels and temperature, maximum allowed power, and maximum allowed temperature.

Illumination data: Data representing illumination.

Illumination content media: a device containing illumination data representing illumination that is associated with illumination content.

What is claimed is:

1. An illumination content editing system comprising:
   a frame processor implemented in a computing system to edit frames of illumination content and change illumination represented; and
   an encoder coupled to encode a sequence of frames into illumination content for playing by an illumination system.

2. The system of claim 1, further comprising a control module implemented in the computing system and providing a user interface enabling user control of editing operations that the frame processor performs on the illumination content.

3. The system of claim 2, wherein the control module enables to the user to select an operation that the frame processor performs to edit frames of illumination content, the operation being selected from a group consisting of:
   a delete operation that removes a frame from the illumination content;
   an insert operation that inserts a frame in the illumination content;
   a replace operation that replaces a first frame in the illumination content with a second frame;
   a time transformation that modifies timing of one or more frames in the illumination content;
   a reverse operation that reverses an order of a series of frames in the illumination content;
   a scaling operation that alters an intensity of a spectral power distribution represented in a frame; and
   a spectral transformation of a frame.

4. An illumination content editing system comprising:
   a frame processor implemented in a computing system to alter frames of illumination content;
   an encoder coupled to encode a sequence of frames into illumination content for playing by an illumination system; and
   a light player coupled to illuminate an environment of the illumination content editor with illumination represented by a frame selected for the frame processor to alter, wherein illumination from the light player changes as the frame processor alters the frame.

5. The system of claim 4, further comprising a control module implemented in the computing system and providing a user interface that enables user control of the frame processor and the encoder.

6. An illumination content editing system comprising:
   a frame processor implemented in a computing system to alter frames of illumination content;
   an encoder coupled to encode a sequence of frames into illumination content for playing by an illumination system; and
   a control module configured to present a display including a first plot that shows time dependence of a photometric quantity characteristic of illumination represented by the illumination content.

7. The system of claim 6, wherein the photometric quantity is selected from a group consisting of luminous flux, illumination power, radiance, luminance, chroma, a function of a tristimulus value, a coordinate in color space, a function of a coordinate in color space, or correlated color temperature of illumination represented by the frames of the illumination content.

8. The system of claim 6, wherein the control module responds to user input selecting a location on the display by designating a time index of a selected frame for the frame processor to alter.

9. The system of claim 8, wherein the control module is further configured to present a second plot, the second plot showing a spectral power distribution represented by the selected frame.

10. The system of claim 8, wherein the control module is further configured to present a second plot, the second plot showing a spectral power distribution that a spectral channel of the illumination system emits when the illumination system plays the selected frame.

11. The system of claim 10, wherein the control module responds to user input designating a change in the second plot by directing the frame processor to alter the spectral power distribution represented by the selected frame.

12. The system of claim 6, wherein the control module responds to user input designating a change in the second plot by directing the frame processor to alter the spectral power distribution represented by the selected frame.

13. The system of claim 6, wherein the control module responds to user input selecting a location on the first plot by activating a user interface to accept user commands designating an editing operation for the frame processor to performed at a time index of a selected frame corresponding to the location.

14. The system of claim 13, wherein the editing operation is selected from a group consisting of:
    a delete operation that removes the selected frame from the illumination content;
    an insert operation that inserts a new frame at the time index in the illumination content;
    a replace operation that replaces the selected frame in the illumination content with a new frame;
    a time transformation that modifies timing of one or more frames in the illumination content;
    a reverse operation that reverses an order of a series of frames in the illumination content;
    a scaling operation that alters an intensity of a spectral power distribution represented in the selected frame; and
    a spectral transformation of the selected frame.

15. An illumination editing process, comprising:
representing illumination as a sequence of frames, wherein each of the frames contains a representation of a spectral power distribution to be played at a time associated with the frame;
designating a selected time within a duration of the illumination; and
performing an editing operation on the frame corresponding to the selected time within the duration of the illumination.

16. The process of claim 15, wherein the editing operation is selected from a group consisting of:
a delete operation that removes the selected frame from the illumination content;
an insert operation that inserts a new frame at the time index in the illumination content;
a replace operation that replaces the selected frame in the illumination content with a new frame;
a time transformation that modifies timing of one or more frames in the illumination content;
a reverse operation that reverses an order of a series of frames in the illumination content;
a scaling operation that alters an intensity of a spectral power distribution represented in the selected frame; and
a spectral transformation of the selected frame.

17. A system including an illumination content translator for converting first illumination content into second illumination content, wherein:

the first illumination content contains a representation of S input tracks respectively corresponding to light output from S luminaires;
the second illumination content contains a representation lighting from T luminaires in an illumination system, S and T being different positive integers; and
the illumination content translator comprises a computing system implementing a spatial interpolator to process S input tracks to produce T output tracks respectively representing lighting from the T luminaires in the illumination system.

18. The system of claim 17, wherein the computing system further comprises an input track converter to convert S source tracks that are in a format employed by in the first illumination system to a second format of the S input tracks.

19. The system of claim 17, wherein the computing system further comprises an output track converter to convert the T output tracks from a first format to a second format employed in the second illumination system.

20. The system of claim 17, wherein the spatial interpolator produces the T output tracks by calculating combination of the S input tracks using weighting factors determined using information including positions of the S luminaires in the first illumination system and positions of the T luminaires in the second illumination systems.

* * * * *